US012422933B2

(12) United States Patent
Dogrusoz et al.

(10) Patent No.: US 12,422,933 B2
(45) Date of Patent: Sep. 23, 2025

(54) MULTI-DEVICE GESTURE CONTROL

(71) Applicant: Apple Inc., Cupertino, CA (US)

(72) Inventors: Kaan E. Dogrusoz, Santa Clara, CA (US); Ali Moin, Berkeley, CA (US); Joseph Cheng, Santa Clara, CA (US); Erdrin Azemi, San Mateo, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 17/852,260

(22) Filed: Jun. 28, 2022

(65) Prior Publication Data

US 2023/0076716 A1     Mar. 9, 2023

Related U.S. Application Data

(60) Provisional application No. 63/240,865, filed on Sep. 3, 2021.

(51) Int. Cl.
| | |
|---|---|
| *G06F 3/01* | (2006.01) |
| *G06F 3/0346* | (2013.01) |
| *G06F 3/04817* | (2022.01) |
| *G06F 3/0482* | (2013.01) |
| *G06F 3/0484* | (2022.01) |

(52) U.S. Cl.
CPC .............. *G06F 3/017* (2013.01); *G06F 3/015* (2013.01); *G06F 3/0346* (2013.01); *G06F 3/04817* (2013.01); *G06F 3/0482* (2013.01); *G06F 3/0484* (2013.01)

(58) Field of Classification Search
CPC ........ G06F 3/017; G06F 3/015; G06F 3/0346; G06F 3/04817; G06F 3/0482; G06F 3/0484
See application file for complete search history.

(56) References Cited

U.S. PATENT DOCUMENTS

| | | |
|---|---|---|
| 6,266,098 B1 | 7/2001 | Cove et al. |
| 7,836,437 B2 | 11/2010 | Kacmarcik |
| | (Continued) | |

FOREIGN PATENT DOCUMENTS

| | | |
|---|---|---|
| CN | 101833286 A | 9/2010 |
| CN | 101910960 A | 12/2010 |
| | (Continued) | |

OTHER PUBLICATIONS

International Search Report and Written Opinion from PCT/US2022/039885, dated Dec. 9, 2022, 15 pages.

(Continued)

*Primary Examiner* — Pei Yong Weng
(74) *Attorney, Agent, or Firm* — BAKERHOSTETLER

(57) ABSTRACT

Aspects of the subject technology relate to gesture-control inputs to an electronic device for controlling one or more other devices. The electronic device can efficiently provide gesture control for multiple other devices by mapping a finite set of user gestures to a specific set of gesture-control elements for each of the multiple other devices. In this way a single gesture can be detected for potentially controlling various different functions of various different devices. Prior to gesture control, the electronic device may receive a selection of a particular one of the multiple other devices for control, and obtain the specific set of gesture-control elements for gesture control of that selected device.

23 Claims, 16 Drawing Sheets

(56) References Cited

U.S. PATENT DOCUMENTS

| | | | |
|---|---|---|---|
| 8,643,951 | B1 | 2/2014 | Wheeler |
| 9,377,865 | B2 | 6/2016 | Berenson et al. |
| 9,466,121 | B2 | 10/2016 | Yang et al. |
| 9,691,161 | B1 | 6/2017 | Yalniz et al. |
| 10,048,748 | B2 | 8/2018 | Sridharan et al. |
| 10,170,123 | B2 | 1/2019 | Orr et al. |
| 10,339,714 | B2 | 7/2019 | Corso et al. |
| 10,373,381 | B2 | 8/2019 | Nuernberger et al. |
| 10,416,760 | B2 | 9/2019 | Burns et al. |
| 10,732,708 | B1 | 8/2020 | Roche et al. |
| 10,832,031 | B2 | 11/2020 | Kienzle et al. |
| 11,112,875 | B1 | 9/2021 | Zhou |
| 11,449,802 | B2 | 9/2022 | Maalouf et al. |
| 11,507,183 | B2 | 11/2022 | Manjunath et al. |
| 2005/0162402 | A1 | 7/2005 | Watanachote |
| 2009/0252311 | A1 | 10/2009 | Kuiken |
| 2011/0054360 | A1 | 3/2011 | Son et al. |
| 2012/0200497 | A1 | 8/2012 | Nasiri et al. |
| 2012/0236161 | A1 | 9/2012 | Kwon |
| 2013/0290001 | A1 | 10/2013 | Yun et al. |
| 2013/0315038 | A1 | 11/2013 | Ferren et al. |
| 2014/0045547 | A1 | 2/2014 | Singamsetty et al. |
| 2014/0129006 | A1 | 5/2014 | Chen et al. |
| 2014/0237366 | A1 | 8/2014 | Poulos et al. |
| 2014/0310595 | A1 | 10/2014 | Acharya et al. |
| 2015/0133051 | A1 | 5/2015 | Jamal-Syed et al. |
| 2016/0062459 | A1 | 3/2016 | Publicover et al. |
| 2016/0266653 | A1* | 9/2016 | Liu .................. G06F 3/0304 |
| 2017/0105190 | A1 | 4/2017 | Logan et al. |
| 2018/0046851 | A1 | 2/2018 | Kienzle et al. |
| 2018/0152557 | A1 | 5/2018 | White et al. |
| 2018/0157398 | A1 | 6/2018 | Kaehler et al. |
| 2018/0174363 | A1 | 6/2018 | Vanblon et al. |
| 2018/0329512 | A1* | 11/2018 | Liao .................. G06F 3/012 |
| 2019/0096134 | A1 | 3/2019 | Amacker et al. |
| 2019/0146219 | A1 | 5/2019 | Rodriguez |
| 2020/0105260 | A1 | 4/2020 | Piernot et al. |
| 2020/0264741 | A1* | 8/2020 | Kreiner ............ G06F 3/0482 |
| 2020/0372719 | A1 | 11/2020 | Andjelic et al. |
| 2021/0124417 | A1 | 4/2021 | Ma |
| 2021/0201029 | A1 | 7/2021 | Ju et al. |
| 2021/0358294 | A1 | 11/2021 | Parashar et al. |
| 2022/0083188 | A1 | 3/2022 | Lin |
| 2022/0130126 | A1 | 4/2022 | Delgado et al. |
| 2022/0254341 | A1 | 8/2022 | Naganna et al. |
| 2023/0007671 | A1 | 1/2023 | Garcia-Luna-Aceves et al. |
| 2023/0409174 | A1 | 12/2023 | Liang et al. |
| 2023/0409179 | A1 | 12/2023 | Liang et al. |

FOREIGN PATENT DOCUMENTS

| | | |
|---|---|---|
| CN | 103093755 A | 5/2013 |
| CN | 103809548 A | 5/2014 |
| CN | 107506037 A | 12/2017 |
| EP | 2393056 A1 | 12/2011 |
| EP | 2940556 A1 | 11/2015 |
| EP | 2996359 | 3/2016 |
| EP | 3076267 | 10/2016 |
| EP | 3345379 | 7/2018 |
| EP | 3971688 A1 | 3/2022 |
| KR | 10-2017-0075625 | 7/2017 |
| TW | M348993 U | 1/2009 |
| WO | WO 2018/090060 A1 | 5/2018 |
| WO | WO 2020/068040 | 4/2020 |
| WO | WO 2020/222871 | 11/2020 |
| WO | WO 2021/188439 A1 | 9/2021 |

OTHER PUBLICATIONS

Final Office Action received for U.S. Appl. No. 17/951,851 mailed on Aug. 16, 2023, 15 pages.
Applicant Initiated Interview Summary received for U.S. Appl. No. 17/951,851, mailed on Jun. 30, 2023, 2 pages.
Non-final Office Action received for U.S. Appl. No. 17/951,834 mailed on Mar. 30, 2023, 13 pages.
Non-final Office Action received for U.S. Appl. No. 17/951,851 mailed on Apr. 13, 2023, 11 pages.
Applicant-Initiated Interview Summary received for U.S. Appl. No. 17/951,834, mailed on Dec. 22, 2023, 3 pages.
International Search Report and Written Opinion from PCT/US2023/025160, mailed Nov. 20, 2023, 20 pages.
Non-final Office Action received for U.S. Appl. No. 17/852,260 mailed on Oct. 26, 2023, 6 pages.
Non-final Office Action received for U.S. Appl. No. 17/951,834 mailed on Nov. 14, 2023, 17 pages.
Invitation to Pay Additional Fees and Partial International Search Report received for PCT Patent Application No. PCT/US2023/025160, mailed on Sep. 29, 2023, 13 pages.
Applicant-Initiated Interview Summary received for U.S. Appl. No. 17/951,851, mailed on Sep. 28, 2023, 2 pages.
Final Office Action received for U.S. Appl. No. 17/951,834, dated May 31, 2024, 17 pages.
Final Office Action received for U.S. Appl. No. 17/951,851, dated Jul. 26, 2024, 14 pages.
Interview Summary received for U.S. Appl. No. 17/951,834, Jun. 28, 2024, 4 pages.
Interview Summary received for U.S. Appl. No. 17/951,834, Oct. 11, 2024, 5 pages.
Interview Summary received for U.S. Appl. No. 17/951,851, May 21, 2024, 2 pages.
Interview Summary received for U.S. Appl. No. 17/951,851, Oct. 23, 2024, 2 pages.
Non-final Office Action received for U.S. Appl. No. 17/951,834, dated Aug. 22, 2024, 21 pages.
Non-final Office Action received for U.S. Appl. No. 17/951,851, dated Mar. 14, 2024, 16 pages.
Final Office Action received for U.S. Appl. No. 17/951,834, dated Dec. 18, 2024, 18 pages.
International Preliminary Report on Patentability received for PCT Patent Application No. PCT/US2023/025160, dated on Dec. 26, 2024, 15 pages.
Non-final Office Action received for U.S. Appl. No. 17/951,851, dated Feb. 13, 2025, 14 pages.
Non-final Office Action received for U.S. Appl. No. 17/951,834, dated Mar. 26, 2025, 18 pages.
Advisory Action received for U.S. Appl. No. 17/951,834, dated Feb. 12, 2025, 3 pages.
Applicant-Initiated Interview Summary received for U.S. Appl. No. 17/951,834, dated Apr. 22, 2025, 4 pages.
Applicant-Initiated Interview Summary received for U.S. Appl. No. 17/951,834, dated Jan. 25, 2025, 3 pages.
Final Office Action received for U.S. Appl. No. 17/951,851, dated May 19, 2025, 17 pages.
Applicant-Initiated Interview Summary received for U.S. Appl. No. 17/951,851, dated May 9, 2025, 2 pages.

* cited by examiner

MULTI-DEVICE GESTURE CONTROL

CROSS REFERENCE TO RELATED APPLICATIONS

This application claims the benefit of priority to U.S. Provisional Patent Application No. 63/240,865, entitled, "Multi-Device Gesture Control", filed on Sep. 3, 2021, the disclosure of which is hereby incorporated by reference herein.

TECHNICAL FIELD

The present description relates generally to gesture-based control of electronic devices, including, for example, multi-device gesture control.

BACKGROUND

Electronic devices such as wearable electronic devices are often provided with input components such as keyboards, touchpads, touchscreens, or buttons that enable a user to interact with the electronic device. In some cases, an electronic device can be configured to accept a gesture input from a user for controlling the electronic device.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Aspects of the subject disclosure provide for gesture control, using a finite set of gestures detectable at a first electronic device, of various different control elements of various different second electronic devices, such as internet-of-things (IoT) devices and/or other types of electronic devices. For example, an environment may include multiple devices that each has a set of one or more control elements, such as switches, knobs, dials, buttons, and the like. As examples, the multiple devices may include an IoT device and a smart speaker. The IoT device may be a network-connected light source and may include a set of control elements such as an on-off switch and a dimmer. The smart speaker may include a different set of control elements such as a play button, a stop button, a pause button, and a volume knob.

In accordance with one or more implementations, a first electronic device such as a smart watch or other wearable device, a smartphone, or the like can provide for (i) gesture-based selection (e.g., using a first sensor such as an ultra-wide band (UWB) sensor, a Bluetooth Low Energy (BLE) sensor, an image sensor coupled with a computer-vision engine, etc.) of another device (e.g., from among multiple devices) for gesture control, (ii) surfacing of an appropriate set of control element icons for the selected device (e.g., as stored at the first electronic device during a registration or pairing of the selected device for gesture control), (iii) gesture-based selection (e.g., using one or more other sensors such as inertial measurement unit (IMU) sensors including one or more of an accelerometer, a gyroscope and a magnetometer) of one of the set of control element icons for the selected device, and (iv) gesture-based control (e.g., using one or more additional sensors such as electromyography (EMG) sensors) of the selected one of the set of control element icons.

Figure 1:
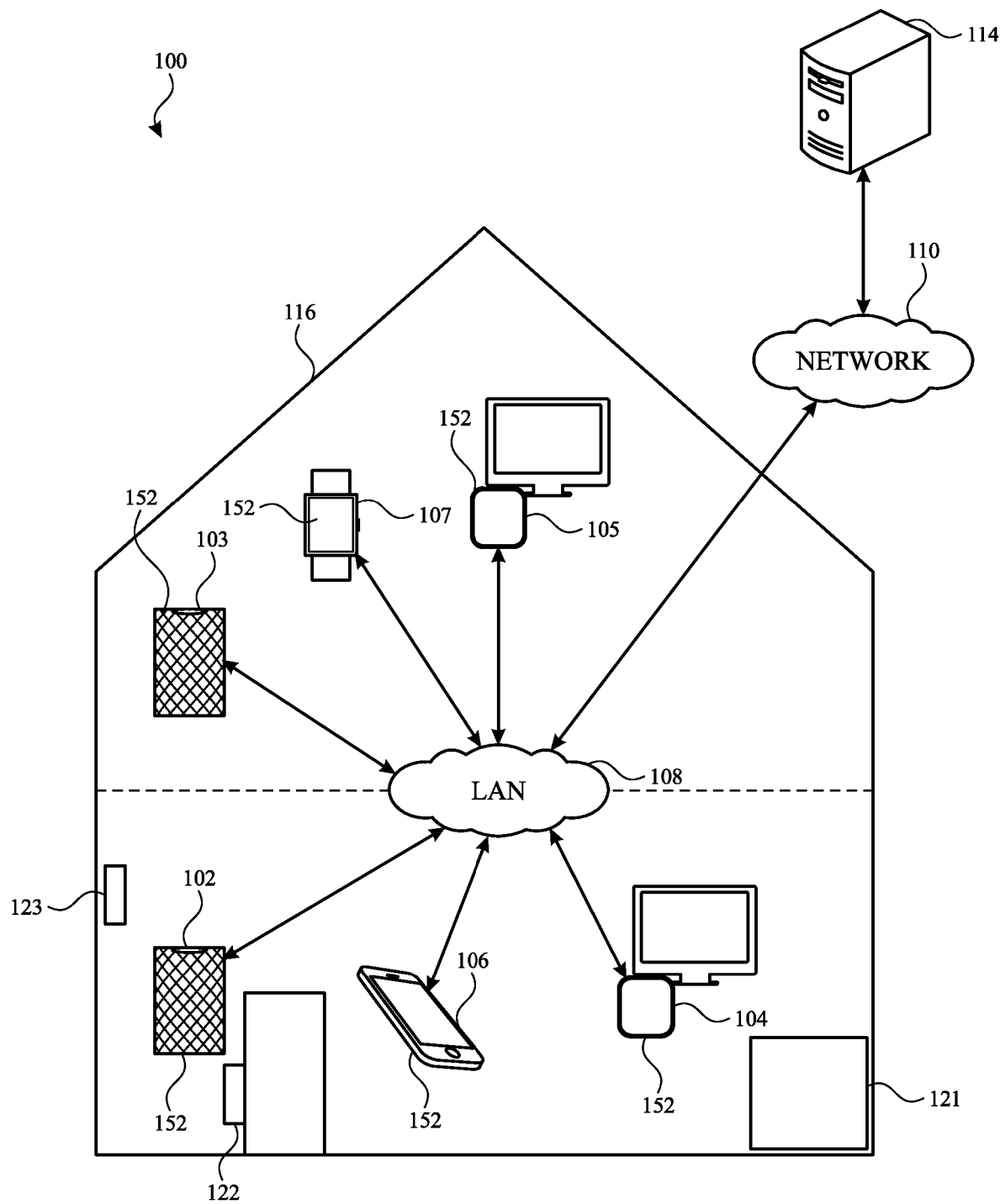
FIG. 1 illustrates an example network environment in accordance with one or more implementations.

FIG. 1 illustrates an example network environment 100 that includes various devices in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes electronic devices 102, 103, 104, 105, 106 and 107 (hereinafter "the electronic devices 102-107"), a local area network ("LAN") 108, a network 110, and one or more servers, such as server 114.

In one or more implementations, one, two, or more than two (e.g., all) of the electronic devices 102-107 may be associated with (e.g., registered to and/or signed into) a common account, such as an account (e.g., user account) with the server 114. As examples, the account may be an account of an individual user or a group account. As illustrated in FIG. 1, one or more of the electronic devices 102-107 may include one or more sensors 152 for sensing aspects of the environment around the device, such as the presence or location of other devices and/or gestures performed by a user of the device.

In one or more implementations, the electronic devices 102-107 may form part of a connected home environment 116, and the LAN 108 may communicatively (directly or indirectly) couple any two or more of the electronic devices 102-107 within the connected home environment 116. Moreover, the network 110 may communicatively (directly or indirectly) couple any two or more of the electronic devices 102-107 with the server 114, for example, in conjunction with the LAN 108. Electronic devices such two or more of the electronic devices 102-107 may communicate directly over a secure direct connection in some scenarios, such as when electronic device 106 is in proximity to electronic device 105. Although the electronic devices 102-107 are depicted in FIG. 1 as forming a part of a connected home environment in which all of the devices are connected to the LAN 108, one or more of the electronic devices 102-107 may not be a part of the connected home environment and/or may not be connected to the LAN 108 at one or more times.

In one or more implementations, the LAN 108 may include one or more different network devices/network medium and/or may utilize one or more different wireless and/or wired network technologies, such as Ethernet, optical, Wi-Fi, Bluetooth, Zigbee, Powerline over Ethernet, coaxial, Ethernet, Z-Wave, cellular, or generally any wireless and/or wired network technology that may communicatively couple two or more devices.

In one or more implementations, the network 110 may be an interconnected network of devices that may include, and/or may be communicatively coupled to, the Internet. For explanatory purposes, the network environment 100 is illustrated in FIG. 1 as including electronic devices 102-107, and the server 114; however, the network environment 100 may include any number of electronic devices and any number of servers.

One or more of the electronic devices 102-107 may be, for example, a portable computing device such as a laptop computer, a smartphone, a smart speaker, a peripheral device (e.g., a digital camera, headphones), a digital media player, a tablet device, a wearable device such as a smartwatch or a band, a connected home device, such as a wireless camera, a router and/or wireless access point, a wireless access device, a smart thermostat, smart light bulbs, home security devices (e.g., motion sensors, door/window sensors, etc.), smart outlets, smart switches, and the like, or any other appropriate device that includes and/or is communicatively coupled to, for example, one or more wired or wireless interfaces, such as WLAN radios, cellular radios, Bluetooth radios, Zigbee radios, near field communication (NFC) radios, and/or other wireless radios.

By way of example, in FIG. 1 each of the electronic devices 102-103 is depicted as a smart speaker, the electronic device 106 is depicted as a smartphone, the electronic device 107 is depicted as a smartwatch, and each of the electronic devices 104 and 105 is depicted as a digital media player (e.g., configured to receive digital data such as music and/or video and stream it to a display device such as a television or other video display). In one or more implementations, one or more of the electronic devices 104 and 105 may be integrated into or separate from a corresponding display device. One or more of the electronic devices 102-107 may be, and/or may include all or part of, the device discussed below with respect to FIGS. 2A and 2B, and/or the electronic system discussed below with respect to FIG. 15.

In one or more implementations, one or more of the electronic devices 102-107 may include one or more machine learning models that provides an output of data corresponding to a prediction or transformation or some other type of machine learning output. As shown in FIG. 1, the network environment 100 may also include one or more controllable devices including the electronic devices 102-107 and additional devices such as an appliance 121, a light source 123 (e.g., a lamp, a floor light, a ceiling light, or any other lighting device), and/or an IoT device 122 (e.g., a wireless camera, a router and/or wireless access point, a wireless access device, a smart thermostat, smart light bulbs, home security devices (e.g., motion sensors, door/window sensors, etc.), smart outlets, smart switches, and the like, or any other appropriate device, appliance, machine, or object that includes and/or is communicatively coupled to, for example, one or more wired or wireless interfaces, such as WLAN radios, cellular radios, Bluetooth radios, Zigbee radios, near field communication (NFC) radios, and/or other wireless radios). In the example of FIG. 1, one or more of the electronic devices 102-107, such as the electronic device 106 and/or the electronic device 107, may be configured as gesture-control devices that are capable recognizing gestures for controlling one or more other devices, such as one or more of the electronic device 102, the electronic device 103, the electronic device 104, the electronic device 105, the appliance 121, the light source 123, and/or the IoT device 122.

In one or more implementations, the server 114 may be configured to perform operations in association with user accounts such as: storing data (e.g., user settings/preferences, files such as documents and/or photos, etc.) with respect to user accounts, sharing and/or sending data with other users with respect to user accounts, backing up device data with respect to user accounts, and/or associating devices and/or groups of devices with user accounts.

One or more of the servers such as the server 114 may be, and/or may include all or part of the device discussed below with respect to FIGS. 2A and 2B, and/or the electronic system discussed below with respect to FIG. 15. For explanatory purposes, a single server 114 is shown and discussed herein. However, one or more servers may be provided, and each different operation may be performed by the same or different servers.

Figure 2A:
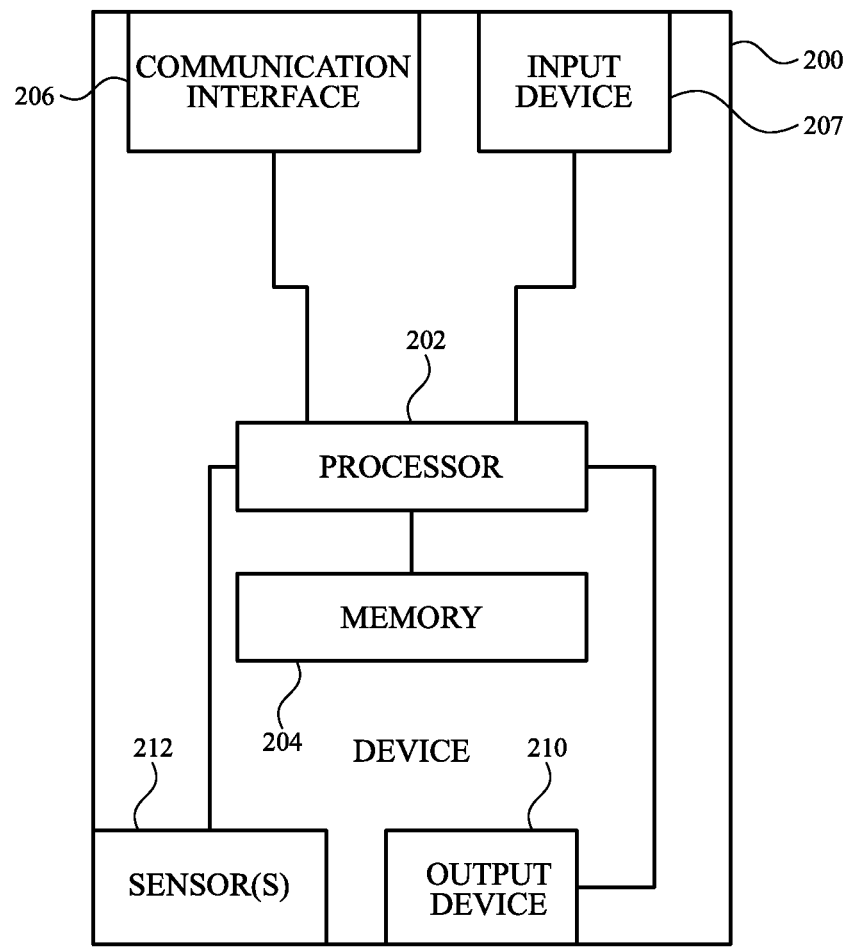
FIGS. 2A and 2B illustrate an example device that may implement a system for gesture control of other devices in accordance with one or more implementations.

FIG. 2A illustrates an example device that may implement a system for gesture control of other systems in accordance with one or more implementations. For example, the device 200 of FIG. 2A can correspond to the electronic device 106 or the electronic device 107 FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The device 200 may include a processor 202, a memory 204, a communication interface 206, an input device 207, an output device 210, and one or more sensors 212. The processor 202 may include suitable logic, circuitry, and/or code that enable processing data and/or controlling operations of the device 200. In this regard, the processor 202 may be enabled to provide control signals to various other components of the device 200. The processor 202 may also control transfers of data between various portions of the device 200. Additionally, the processor 202 may enable implementation of an operating system or otherwise execute code to manage operations of the device 200.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

In one or more implementations, the memory 204 may store one or more gesture recognition models, one or more gesture sets corresponding to one or more other devices, and/or other information (e.g., locations, identifiers, location information, etc.) associated with one or more other devices, using data stored locally in memory 204. Moreover, the input device 207 may include suitable logic, circuitry, and/or code for capturing input, such as audio input, remote control input, touchscreen input, keyboard input, etc. The output device 210 may include suitable logic, circuitry, and/or code for generating output, such as audio output, display output, light output, and/or haptic and/or other tactile output (e.g., vibrations, taps, etc.).

The sensors 212 may include one or more ultra-wide band (UWB) sensors, one or more inertial measurement unit (IMU) sensors (e.g., one or more accelerometers, one or more gyroscopes, one or more compasses and/or magnetometers, etc.), one or more image sensors (e.g., coupled with and/or including an computer-vision engine), one or more electromyography (EMG) sensors, optical sensors, light sensors, image sensors, pressure sensors, strain gauges, lidar sensors, proximity sensors, ultrasound sensors, radio-frequency (RF) sensors, platinum optical intensity sensors, and/or other sensors for sensing aspects of the environment around the device 200 (e.g., including objects, devices, and/or user movements and/or gestures in the environment).

The communication interface 206 may include suitable logic, circuitry, and/or code that enables wired or wireless communication, such as between any of the electronic devices 102-107 and/or the server 114 over the network 110 (e.g., in conjunction with the LAN 108). The communication interface 206 may include, for example, one or more of a Bluetooth communication interface, a cellular interface, an NFC interface, a Zigbee communication interface, a WLAN communication interface, a USB communication interface, or generally any communication interface.

In one or more implementations, one or more of the processor 202, the memory 204, the communication interface 206, the input device 207, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 2B:
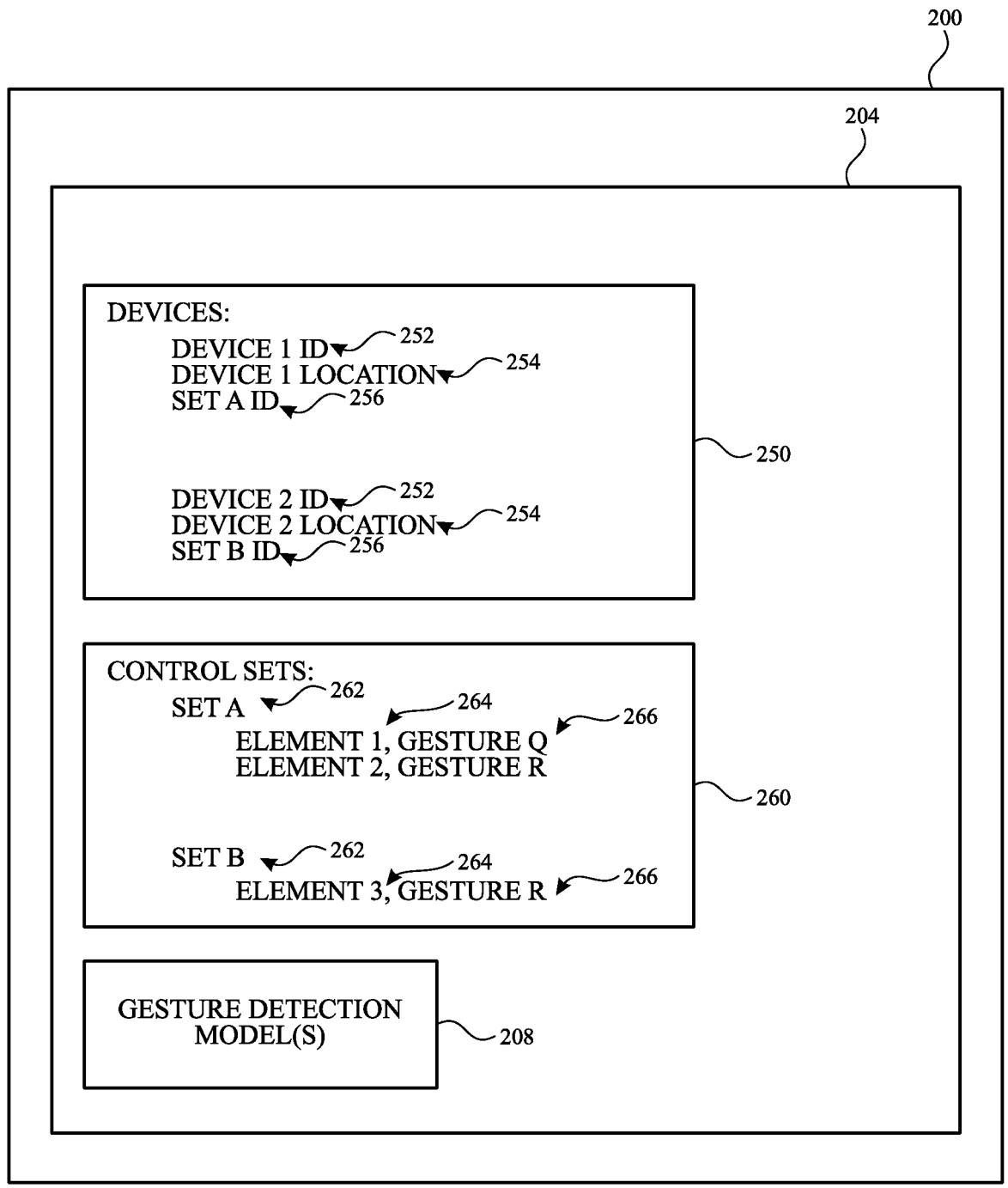

FIG. 2B illustrates information that may be stored by the memory 204 of device 200 in accordance with one or more implementations. For example, the device 200 may store device information 250, control sets 260, and/or one or more gesture detection models 208. As shown, device information 250 may include, for each of one or more devices other than the device 200, a device identifier 252 (e.g., Device 1 ID, Device 2 ID, etc., each corresponding to a device that has been registered or enrolled with the device 200 for control by the device 200), a device location 254 (e.g., Device 1 Location, Device 2 Location, etc., corresponding to an enrolled and/or stored location for the devices identified, respectively, by the Device 1 ID, Device 2 ID, etc.), and a set identifier 256 (e.g., Set A ID, Set B ID, etc., each identifying a set of gesture-control elements for controlling the devices identified, respectively, by the Device 1 ID, Device 2 ID, etc.).

As indicated in FIG. 2B, the set identifier 256 stored in connection with each device identifier 252 may identify a corresponding set 262 of gesture-control elements within the control sets 260. In the example of FIG. 2B, the set identifier "Set A ID" may identify a set "A" of gesture-control elements 264, and the set identifier "Set B ID" may identify a set "B" of gesture-control elements 264. As indicated in FIG. 2B, a set 262 of gesture-control elements 264 may include one gesture-control element, two gesture-control elements, or more than two gesture-control elements (e.g., three gesture-control elements, four gesture-control elements, or more than four gesture-control elements), depending on the device (e.g., depending on a type of the device).

For example, for a light switch identified by a device identifier 252, the corresponding set identifier 256 may identify a set 262 having a single gesture-control element 264 (e.g., an on/off switch, or a dimmer control). As another example, for a smart speaker identified by a device identifier 252, the corresponding set identifier 256 may identify a set 262 having a several gesture-control elements 264 (e.g., a play button, a stop button, a pause button, a volume control knob or dial, and/or one or more other control elements such as audio tuning elements). In the example, of FIG. 3, the set "A", identified by the "Set A ID" for the device identified by the "Device 1 ID" includes two gesture-control elements 264 (e.g., Element 1 and Element 2), and the set "B", identified by the "Set B ID" for the device identified by the "Device 2 ID" includes one gesture-control element 264 (e.g., Element 3).

As shown in FIG. 2B, each gesture-control element 264 may be stored in connection with a corresponding gesture 266 that, when detected by the device 200, operates the corresponding gesture-control element 264. In the example of FIG. 2B, the set 262 of gesture controls corresponding to set "A" (e.g., an identified by the set identifier "Set A ID" for the device identified by "Device 1 ID") includes a first gesture-control element 264 (Element 1) stored in connection with a first gesture 266 (Gesture Q) and a second gesture-control element 264 (Element 2) stored in connection with a second gesture 266 (Gesture R). For example, the Element 1 of set A may be a button, and the gesture Q for operating the button may be a finger-push gesture (e.g., a gesture in which the user extends a finger and moves the finger in a down-up motion by moving the finger relative to the user's hand and/or moving the user's hand relative to the user's arm by bending at the wrist). As another example, the Element 2 of set A may be a knob, and the gesture R for operating the knob may be a pinch-and-rotate gesture (e.g., a gesture in which the user brings together a thumb and a finger in a pinch, and rotates the pinched finger and thumb by rotating the user's hand at the wrist and/or rotating the user's arm). As another example, the Element 3 of set B may be a knob, and the gesture R for operating the knob may be a pinch-and-rotate gesture (e.g., a gesture in which the user brings together a thumb and a finger in a pinch, and rotates the pinched finger and thumb by rotating the user's hand at the wrist and/or rotating the user's arm).

In one or more implementations, the same type of gesture-control element 264 (e.g., a knob, a button, a switch, etc.), controlled by the same gesture (e.g., button-push gesture, a finger-pinch gesture, a finger-pinch and rotate gesture, etc.) can cause a different effect for a different device. For example, in a use case in which Device 1 ID identifies a set-top box (e.g., electronic device 104) and Device 2 ID identifiers a smart dishwasher (e.g., an implementation of appliance 121), Element 2 may represent a play button for media playback and Element 3 may represent a cycle-selection button for a wash cycle. In this use case, depending on which of the set-top box or the washing machine is selected at the device 200 for gesture control (e.g., and also depending on which of several gesture-control elements 264 for the selected device has been selected at the device 200), detection of a button push gesture (e.g., Gesture R) causes the device 200 to start media playback at the set-top box or select a particular wash cycle at the washing machine.

In this way, the device 200 can store machine learning model(s) 208 that are trained to detect a finite set of user gestures (e.g., two gestures, three gestures, four gestures, five gestures, ten gestures, less than ten gestures, less than twenty gestures, etc.) that can be used to control a wide variety of functions of a wide variety of devices. For example, in one more implementations, machine learning models 208 may be trained using training EMG signal patterns generated by training users making each of the finite set of gestures, to detect each of the finite set of gestures when a user makes the same gesture while wearing a device implementing EMG sensors.

In one or more implementations, one or more of machine learning models 208 may receive, as inputs, outputs from one or more of the sensor(s) 212. The machine learning models 208 may have been trained based on outputs from various sensors corresponding to the sensors(s) 212, in order to detect and/or predict a user gesture. When the device 200 detects a user gesture using the sensor(s) 212 and the machine learning models 208, the device 200 may perform a particular action (e.g., generating a control signal corresponding to a selected device and/or a selected gesture-control element for the selected device, and transmitting the control signal to the selected device). In one or more implementations, the machine learning model(s) 208 may be trained based on a local sensor data from the sensor(s) 212 at the device 200, and/or based on a general population of users. In this manner, the machine learning models 208 can be re-used across multiple different users even without a priori knowledge of any particular characteristics of the individual users in one or more implementations. In one or more implementations, a model trained on a general population of users can later be tuned or personalized for a specific user of a device such as the device 200.

Figure 3:
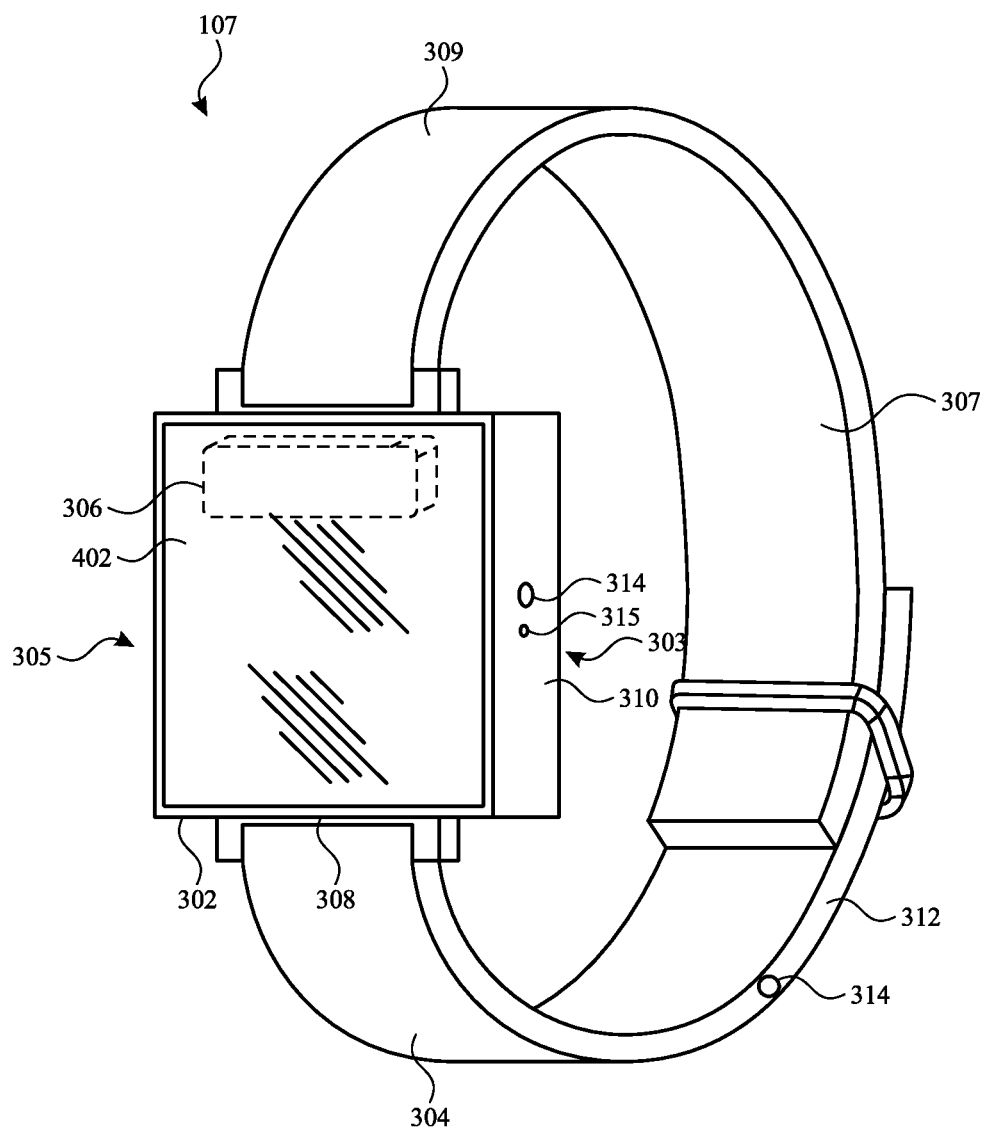
FIG. 3 illustrates a perspective view of an example electronic device in accordance with one or more implementations

In one or more implementations, the device 200 may include various sensors at various locations for determining proximity to one or more devices for gesture control, for determining relative or absolute locations of the device(s) for gesture control, and/or for detecting user gestures (e.g., by providing sensor data from the sensor(s) to machine learning model(s) 208). FIG. 3 illustrates an example in which the device 200 is implemented in the form of the electronic device 107 of FIG. 7, in one exemplary arrangement that can be used for gesture control of multiple other devices.

In the example of FIG. 3, electronic device 107 has been implemented in the form of a smart watch. In this implementation, the electronic device 107 may be a standalone device that performs computing functions such as cellular telephone communications, WiFi communications, digital display functions, fitness tracking functions, or other computing functions, and/or may cooperate with one or more external devices or components such as a smartphone, a gaming system, or other computing system that is wirelessly paired or otherwise wirelessly coupled to the electronic device. For example, hand gestures performed by the hand on which the device is worn (on the attached wrist) can be used as input commands for controlling the electronic device 107 itself and/or for operating one or more other devices, such as any or all of the electronic devices 102-106, the appliance 121, the light source 123, and/or the IoT device 122 of FIG. 1.

As shown in FIG. 3, the electronic device 107 may include a housing 302 and a band 304 that is attached to housing 302. In the example of FIG. 3, housing 302 forms a watch case having an outer surface 305 formed by a display 402. In this example, circuitry 306 (e.g., processor 202, memory 204, sensors 212, communication interface 206 and/or other circuitry of the device 200 of FIGS. 2A and 2B) is disposed within the housing 302.

Housing 302 and band 304 may be attached together at interface 308. Interface 308 may be a purely mechanical interface or may include an electrical connector interface between circuitry within band 304 and circuitry 306 within housing 302 in various implementations. Processing circuitry such as the processor 202 of circuitry 306 may be communicatively coupled to one or more of sensors 212 that are mounted in the housing 302 and/or one or more of sensors 212 that are mounted in the band 304 (e.g., via interface 308).

In the example of FIG. 3, the housing 302 of the electronic device 107 includes sidewall 310 that faces the user's hand when the electronic device 107 is worn. In one or more implementations, the band 304 may also include a sidewall 312. Housing 302 also includes a wrist-interface surface 303 (indicated but not visible in FIG. 3) and an opposing outer surface 305 (e.g., formed by the display 402). Sidewall 310 extends between wrist-interface surface 303 and outer surface 305. In this example, band 304 includes a wrist-interface surface 307 and an opposing outer surface 309, and sidewall 312 extends between wrist-interface surface 307 and outer surface 309.

In one or more implementations, one or more of the sensors 212 may be mounted on or to the sidewall 310 of housing 302. In the example of FIG. 3, an ultra-wide band (UWB) sensor 314 is provided on sidewall 310 in an arrangement in which, when operated, the UWB sensor emits a UWB signal substantially parallel with the user's forearm when the electronic device 107 is worn on the user's wrist, and receives reflected or otherwise returned UWB signals. In this way, the UWB sensor 314 can be used to determine, based on the reflected or otherwise returned UWB signals, when the user's forearm (e.g., and resultingly the electronic device 107) is pointed or otherwise aimed at a particular device for selection of that device for gesture control. In the example of FIG. 3, the electronic device 107 also includes a camera 315 mounted in or to the sidewall. In the example of FIG. 3, the electronic device 107 also include a UWB sensor 314 in the sidewall 312 of the band 304. However, this is merely illustrative. In various implementations, a UWB sensor 314 may be provided on sidewall 310 without any cameras on sidewall 312, and/or without any cameras or UWB sensors in the band 304.

Although various examples, including the example of FIG. 3, are described herein in which a UWB sensor is used to determine a direction in which a device is pointing and/or another device at which the device is aimed or pointed, it is appreciated that other sensors and/or sensing technologies may be used for determining a pointing direction of a device and/or to recognize another device at which the device is aimed or pointed. As examples, other sensors and/or sensing technologies may include a computer-vision engine that receives images of the device environment from an image sensor, and/or a BLE sensor.

Although not visible in FIG. 3, one or more additional sensors 212 may also be provided on wrist-interface surface 303 of housing 302, and communicatively coupled with the circuitry 306. The additional sensors 212 that may be provided on wrist-interface surface 303 may include a photoplethysmography (PPG) sensor configured to detect blood volume changes in microvascular bed of tissue of a user (e.g., where the user is wearing the electronic device 107 on his/her body, such as his/her wrist). The PPG sensor may include one or more light-emitting diodes (LEDs) which emit light and a photodiode/photodetector (PD) which detects reflected light (e.g., light reflected from the wrist tissue). The additional sensors 212 that may be provided on wrist-interface surface 303 may additionally or alternatively correspond to one or more of: an electrocardiogram (ECG) sensor, an electromyogram (EMG) sensor, a mechanomyogram (MMG) sensor, a galvanic skin response (GSR) sensor, and/or other suitable sensor(s) configured to measure biosignals. In one or more implementations, the electronic device 107 may additionally or alternatively include non-biosignal sensor(s) such as one or more sensors for detecting device motion, sound, light, wind and/or other environmental conditions. For example, the non-biosignal sensor(s) may include one or more of: an accelerometer for detecting device acceleration, an audio sensor (e.g., microphone) for detecting sound, an optical sensor for detecting light, and/or other suitable sensor(s) configured to output signals indicating device state and/or environmental conditions, and may be included in the circuitry 306.

It is appreciated that, although an example implementation of the device 200 in a smart watch is described herein in connection with various examples, these examples are merely illustrative, and the device 200 may be implemented in other form factors and/or device types, such as in a smart phone, a tablet device, a laptop computer, another wearable electronic device or any other suitable electronic device that includes, for example, a UWB sensor or other sensor for selection of another device for gesture control, and/or one or more sensors, cameras or the like for detecting gestures.

In general, sensors for detecting gestures may be any sensors that generate input signals (e.g., to machine learning models 208) responsive to physical movements and/or positioning of a user's hand, wrist, arm, and/or any other suitable portion of a user's body. For example, to generate the input signals, the sensors may detect movement and/or positioning of external and/or internal structures of the user's hand, wrist, and/or arm during the physical movements of the user's hand, wrist, and/or arm. For example, light reflected from or generated by the skin of the user can be detected by one or more cameras or other optical or infrared sensors.

As another example, electrical signals generated by the muscles, tendons or bones of the wearer can be detected (e.g., by electromyography sensors). As another example, ultrasonic signals generated by an electronic device and reflected from the muscles, tendons or bones of the user can be detected by an ultrasonic sensor. In general, EMG sensors, ultrasonic sensors, cameras, IMU sensors (e.g., an accelerometer, a gyroscope and/or a magnetometer), and/or other sensors may generate signals that can be provided to machine-learning models 208 to identify a position or a motion of the wearer's hand, wrist, arm, and/or other portion of the user's body, and thereby detect user gestures.

Figure 4:
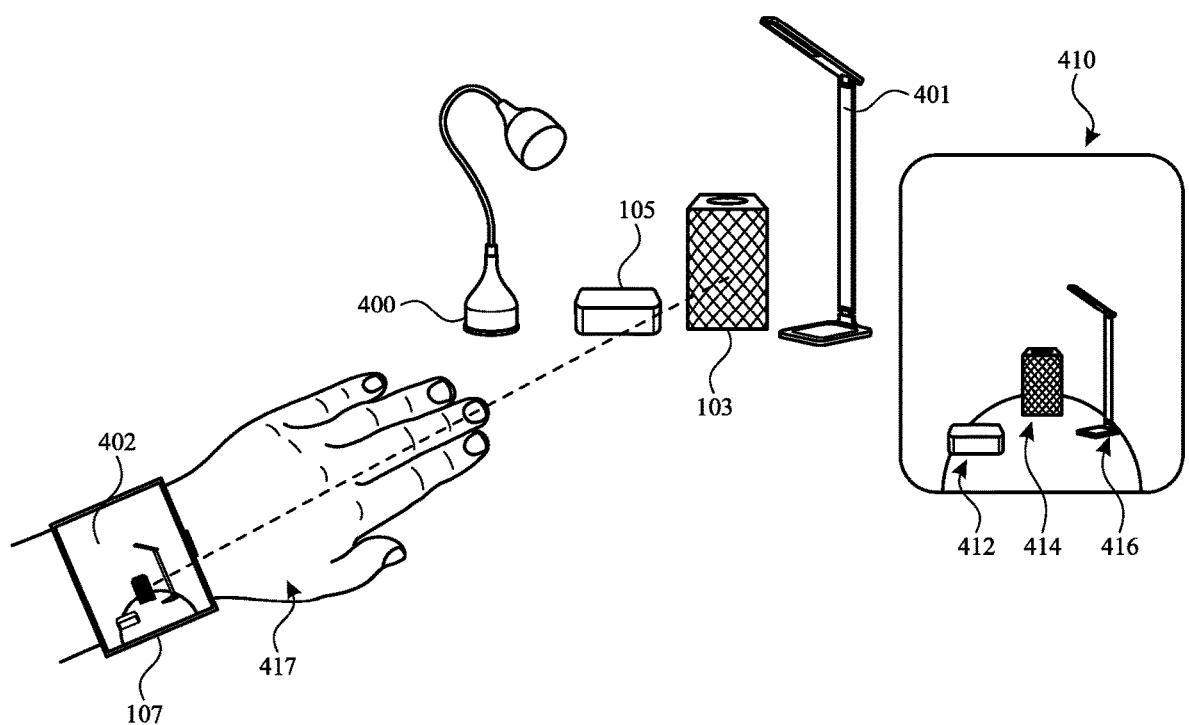
FIG. 4 illustrates a use case in which an electronic device is in proximity of multiple other devices that are available for gesture control in accordance with one or more implementations.

FIG. 4 illustrates an example use case in which the electronic device 107 is within a predetermined range of multiple other devices. In the example of FIG. 4, the multiple other devices include the electronic device 105 (e.g., a set top box), the electronic device 103 (e.g., a smart speaker), a lamp 400 (e.g., an implementation of appliance 121 or light source 123 of FIG. 1), and a lamp 401 (e.g., an implementation of appliance 121 or light source 123 of FIG. 1). In one or more implementations, each of the electronic device 105, the electronic device 103, the lamp 400, and the lamp 401 may have been previously paired or otherwise registered with the electronic device 107 for gesture control. In one or more implementations, one or more or all of the electronic device 105, the electronic device 103, the lamp 400, and the lamp 401 may include UWB circuitry configured for communication with UWB circuitry of the electronic device 107. In one or more implementations, the electronic device 107 may have previously stored (e.g., based on the previous pairing and/or registration operations) a location, a set of gesture controls (e.g., each set including one or more gesture-control elements), connection information, and/or other information for each of the electronic device 105, the electronic device 103, the lamp 400, and the lamp 401 (e.g., and/or one or more additional devices).

In the example of FIG. 4, the electronic device 107 has determined that the electronic device 107 is within a pre-determined range of the electronic device 105, the electronic device 103, the lamp 400, and the lamp 401. As examples, the electronic device 107 may determine that the device 107 is within a predetermined range of the electronic device 105, the electronic device 103, the lamp 400, and the lamp 401 by determining the location of the electronic device 107 relative to a prestored and/or pre-registered map of the locations of the electronic device 105, the electronic device 103, the lamp 400, and the lamp 401 and/or by receiving or exchanging wireless communications, such as direct WiFi (e.g., exchanges of WiFi protocol data directly between WiFi antennas of the devices, without an intervening device or system that relays the WiFi protocol data), Bluetooth, ultra wideband (UWB), or other wireless communications, with the electronic device 105, the electronic device 103, the lamp 400, and the lamp 401 when the electronic device 105, the electronic device 103, the lamp 400, and the lamp 401 are within the pre-determined range. For example, the predetermined range may correspond to the range of a particular sensor, such as a UWB sensor or a BLE antenna, or to the range of a particular communications protocol (e.g., a direct WiFi range, a Bluetooth range, a UWB range, etc.)

In the example of FIG. 4, an enlarged view 410 of the display 402 of the electronic device 107 illustrates an example in which (e.g., responsive to determining, by the electronic device 107, that the user of the electronic device 107 has engaged in a pointing gesture, and that the electronic device 107 is simultaneously pointing in the general direction of and within the predetermined range of the electronic device 105, the electronic device 103, the lamp 400, and the lamp 401) the electronic device 107 provides, for display, device icons arranged according to the corresponding locations of the electronic device 105, the electronic device 103, the lamp 400, and the lamp 401. In the example of FIG. 4, the user of the electronic device 107 has aimed their arm, and consequently the electronic device 107 (e.g., and a UWB sensor of the electronic device 107), at the electronic device 103, such as by aligning their arm along a line that extends toward the electronic device 103. In this example, because the electronic device 107 (e.g., the UWB sensor of the electronic device 107) is pointed at the electronic device 103, the display 402 is displaying a device icon 412 corresponding to the electronic device 103 at a central location on the display 402, and device icons 412 and 416 (corresponding, respectively to the electronic device 105 and the lamp 401) on either side of the device icon 412 (e.g., in accordance with the physical arrangement of the electronic device 105 and the lamp 401 substantially on either side of the electronic device 103). The arrangement of the device icons 412, 414, and 416 may be determined based on a previously determined (e.g., and stored) physical arrangement of the electronic device 105, the electronic device 103, and the lamp 401, or based a real-time determination of the physical arrangement of the electronic device 105, the electronic device 103, and the lamp 401 (e.g., using UWB and/or other sensors and/or signals to determine the real-time locations of the devices relative to the electronic device 107).

Figure 5:
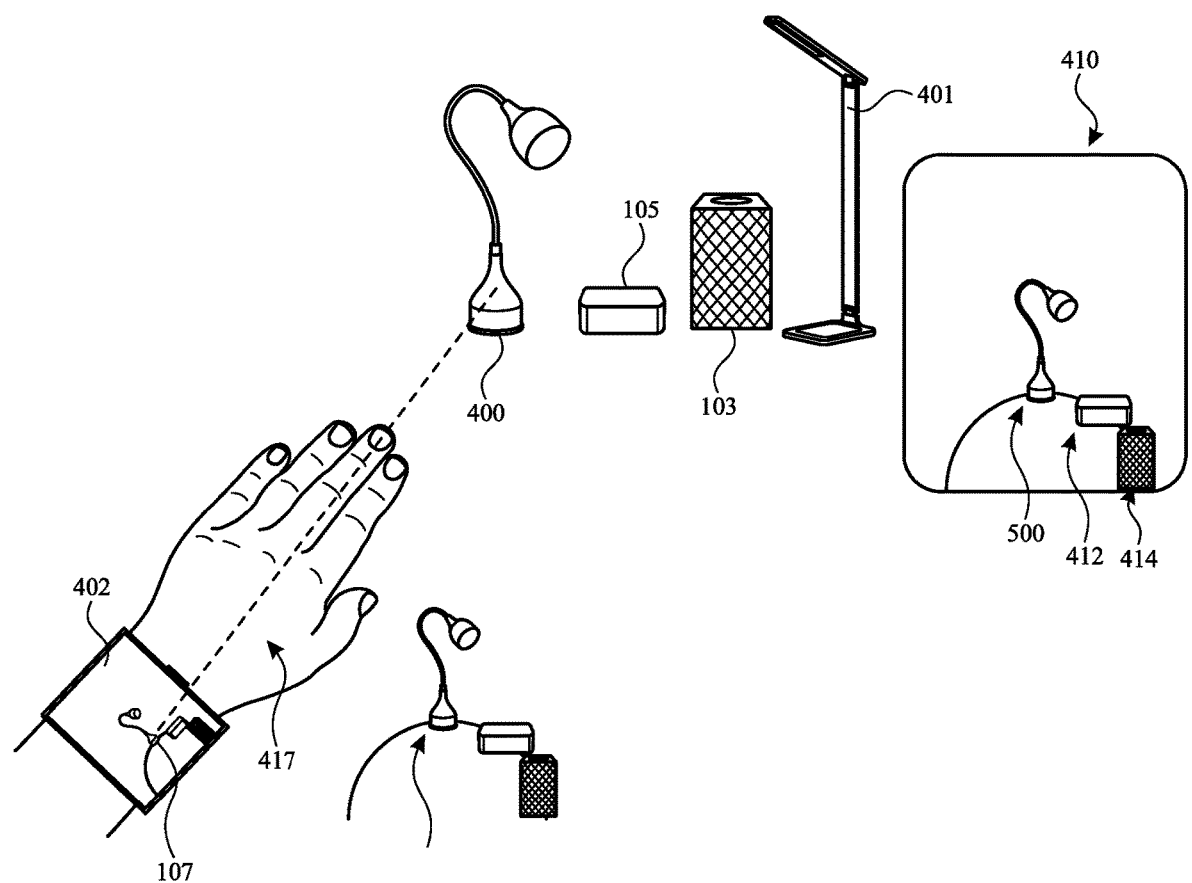
FIG. 5 illustrates a use case in which an electronic device tracks the locations of multiple other devices that are available for gesture control in accordance with one or more implementations.

In one or more implementations, as the electronic device 107 is moved and/or reoriented in the environment including the electronic device 105, the electronic device 103, the lamp 400, and the lamp 401, the arrangement of the device icons (e.g., device icons 412, 414, and 416) may be modified accordingly. For example, in the example of FIG. 5, the user 417 has reoriented the electronic device 107 to point the electronic device 107 (e.g., by moving their arm to aim at the lamp 400 and thus reorient the electronic device 107, which may also correspondingly change the direction in which the UWB sensor of the electronic device 107 is pointed) away from the electronic device 103 and toward the lamp 400. In the example of FIG. 5, the enlarged view 410 of the display 402 of the electronic device 107 shows how the device icons on the display 402 can be rearranged in accordance with the reorientation of the electronic device 107. In this example, the device icons have been rotated, relative to the arrangement of the device icons shown in FIG. 4, such that a device icon 500 corresponding to the lamp 400 is displayed at a central location on the display 402, and device icons 412 and 414 (corresponding, respectively to the electronic device 105 and the electronic device 103) are displayed to the right of the device icon 500 (e.g., in accordance with the physical arrangement of the lamp 400, the electronic device 105 and the electronic device 103 in the physical environment of the electronic device). In this example, the device icon 416 corresponding to the lamp 401 has been rotated off of the viewable display area of the display 402 (e.g., and can be rotated back onto the viewable display area by moving or reorienting the electronic device 107 back in the direction of the lamp 401). The reorientation of the electronic device 107 may be determined based on UWB signals from a UWB sensor of the electronic device, based on IMU signals from one or more IMU sensors (e.g., an accelerometer, a gyroscope, and/or a magnetometer) of the electronic device, and/or other signals from other sensors such as BLE antennas and/or image sensors of the electronic device 107.

In the example of FIGS. 4 and 5, the electronic device 107 displays the device icons of various other devices that are within a predetermined range of the electronic device 107. However, it is also appreciated that, in other examples, the electronic device 107 may display the device icons of one or more other devices that are not within a predetermined range of the electronic device 107 for selection for gesture control (e.g., the device icons 500, 412, 414, and/or 416 can be displayed on the display 402 when the electronic device 107 is remote from the lamp 500, the electronic device 105, the electronic device 103, and/or the lamp 401, so that the electronic device 107 can select from and/or control the lamp 500, the electronic device 105, the electronic device 103, and/or the lamp 401 from a remote location as if the electronic device 107 were within the predetermined range of the lamp 500, the electronic device 105, the electronic device 103, and/or the lamp 401) and/or the electronic device 107 can facilitate selection of another device (e.g., from among multiple other devices) for gesture control without displaying device icons corresponding to the other devices (e.g., the electronic device 107 can provide an indication when the UWB sensor of the electronic device 107 is pointed or aimed at a particular other device, such as lighting up the display, outputting a sound or haptic device, etc., without displaying a device icon on the display of the electronic device 107).

Figure 6:
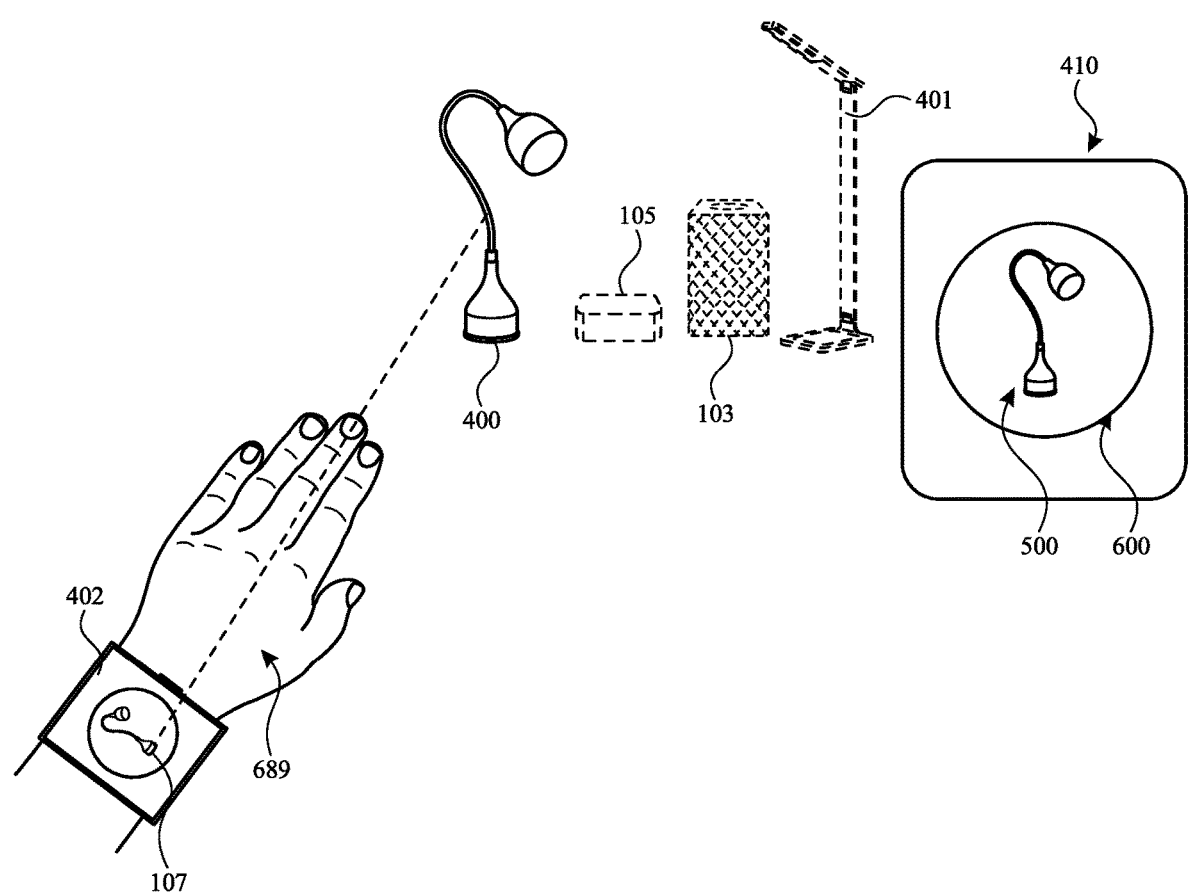
FIG. 6 illustrates a use case in which an electronic device receives a selection of another device for gesture control in accordance with one or more implementations.

As shown in FIG. 6, the electronic device 107 may receive a selection of one of the electronic device 105, the electronic device 103, the lamp 400, and the lamp 401 for gesture control, or may otherwise identify or determine one of the electronic device 105, the electronic device 103, the lamp 400, and the lamp 401 for gesture control. In the example of FIG. 6, the electronic device 107 has received a selection of the lamp 400. In this example, to indicate the selection of the lamp 400, the device icon 500 corresponding to the lamp 400 is enlarged on the display 402, and the device icon 500 for lamp 400 is highlighted with an indicator 600. For example, the indicator 600 of the selection of the lamp 400 may be displayed when data from the UWB sensor of the electronic device 107 indicates that the electronic device 107 is pointed at the lamp 400. For example, the selection of the lamp 400 for gesture control may be received by determining, using the data from the UWB sensor (or a BLE sensor and/or an imaging sensor), that the electronic device is pointed at the lamp 400 as in the example of FIG. 6. In one or more implementations, the lamp 400 can be selected by holding the electronic device 107 pointed at the location corresponding to the lamp 400 for a predetermined period of time (e.g., a period of time that is sufficient for an exchange of UWB or other communications between the UWB or other sensor of the electronic device 107 and the UWB or other sensor of the lamp 400, such as UWB or other communications including a device identifier sent from the lamp 400 to the electronic device 107 responsive to a detection of a UWB or other signal from the electronic device 107), and/or based on the user performing a gesture 689 while the electronic device 107 is pointed at the location corresponding to the lamp 400.

Figure 7:
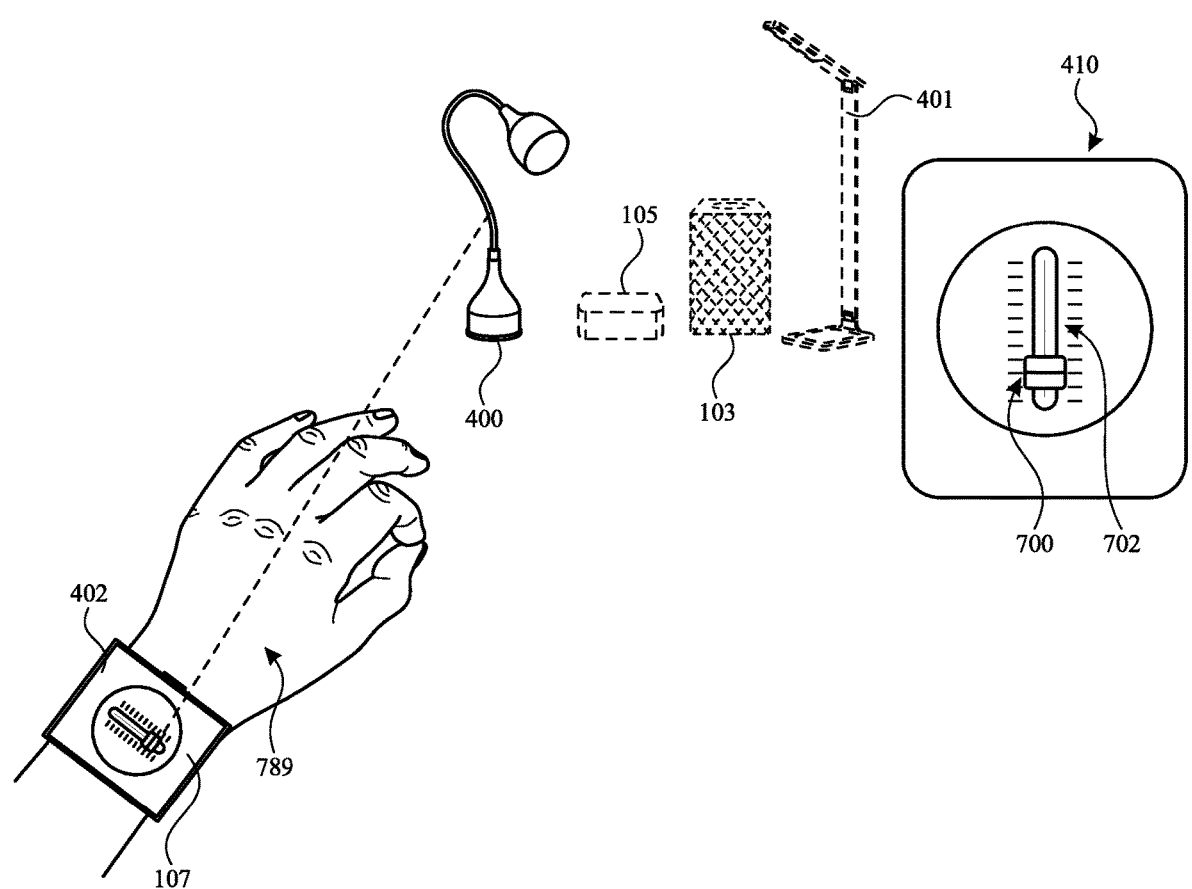
FIG. 7 illustrates a use case in which an electronic device surfaces a gesture-control icon for a gesture-control element of the selected device of FIG. 6 in accordance with one or more implementations.

In one or more implementations, the electronic device 107 may obtain, based on the selection of the lamp 400, one or more gesture-control elements 264 for the lamp 400. For example, FIG. 7 illustrates a use case in which the gesture-control element 264 is a slider 702 that is represented by a gesture-control icon 700 displayed on the display 402. In the example of FIG. 7, the gesture-control element 264 for the lamp 400 may be a single gesture control element (e.g., corresponding to the Element 1 of Set B of the control sets 260 of FIG. 2B). Providing the gesture-control icon 700 in the form of a slider 702 may be helpful to inform the user of the electronic device 102 what gesture to perform to control the lamp 401 (e.g., by simulating the physical control element that is provided with or for the lamp 401 in the physical environment, the operation of which may be familiar to the user).

In the example of FIG. 7, the electronic device 107 may receive a selection of the gesture-control icon 700 based on a pinch gesture 789 by the user of the electronic device 107. For example, the pinch gesture 789 may be detected by the electronic device 107 by receiving sensor data from a sensor (e.g., an image sensor, an EMG sensor, etc.) of the electronic device 107, and providing the received sensor data to a machine learning model 208 that has been trained to recognize a predetermined set gestures based on input sensor data from at least the sensor.

In one or more implementations, the electronic device 107 may then control the lamp 400 by applying one or more additional recognized gestures by the user to gesture-control element 264 corresponding to the selected gesture-control icon 700. For example, a user gesture corresponding to a raising or lowering of the hand by pivoting the hand at the wrist while holding the pinch gesture 789 may be detected by the electronic device 107 by receiving additional sensor data from a sensor (e.g., an image sensor, an EMG sensor, etc.) of the electronic device 107, and providing the additional received sensor data to a machine learning model 208. In one or more implementations, the continuous up/down gesture motion of the user's hand while holding the pinch gesture 789 may be applied to continuously raise or lower the slider 702, and correspondingly continuously generate and transmit control signals to cause the lamp 400 to raise or lower the brightness of the lamp 400. The gesture-control icon 700 is an example of a continuous-control element that can be provided by the electronic device 107 in one or more implementations.

Figure 8:
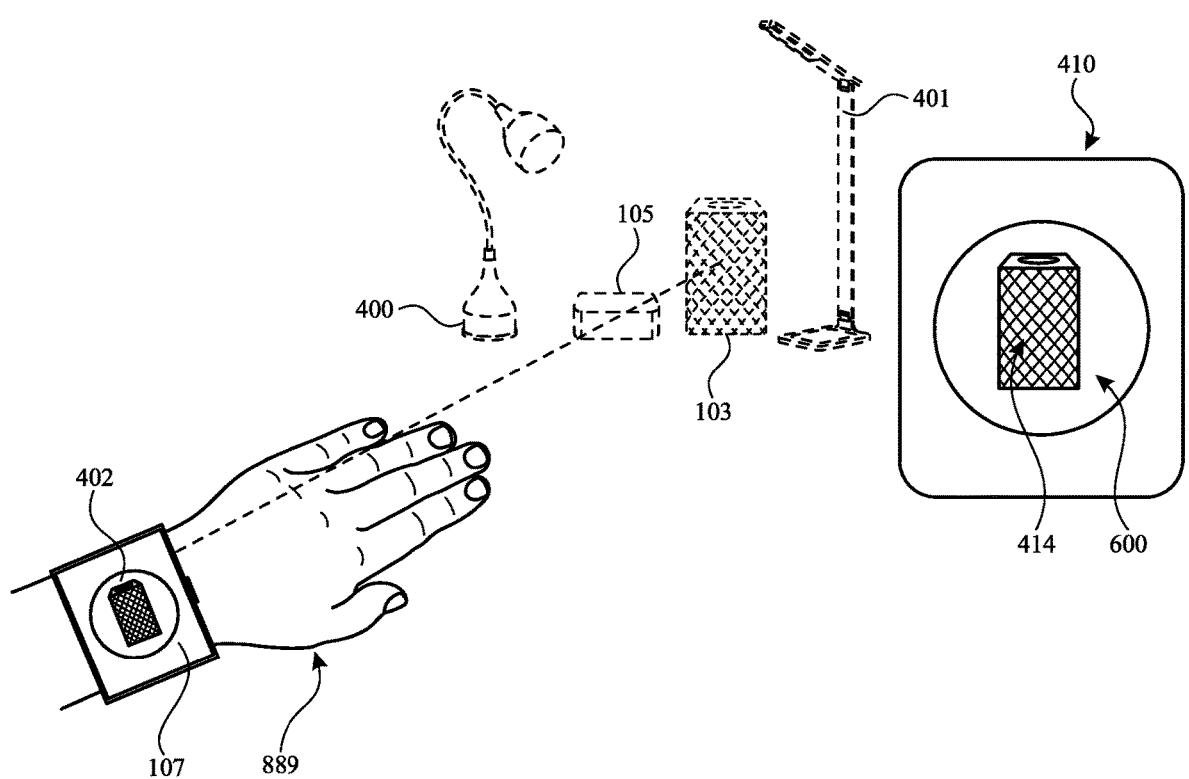
FIG. 8 illustrates a use case in which an electronic device receives a selection of different other device for gesture control in accordance with one or more implementations.

FIG. 8 illustrates another example in which the electronic device 107 has received a selection of the electronic device 103 (e.g., a smart speaker). For example, the user, while wearing the electronic device 107, may have moved their arm to aim the arm (e.g., and resultingly the electronic device 107 and its UWB sensor) away from the lamp 400 toward the electronic device 103. In this example, to indicate the selection of the electronic device 103, the gesture-control icon 700 for the lamp 400 has been removed from the display 402, and the device icon 414 corresponding to the electronic device 103 is displayed and enlarged on the display 402, and the device icon 414 for electronic device 103 is highlighted with the indicator 600. For example, the user of the electronic device 107 may have released the pinch gesture 789 to deselect or release the gesture-control icon 700, and moved the electronic device 107 to point (e.g., with the UWB sensor of the electronic device) at the electronic device 103.

For example, the indicator 600 of the selection of the electronic device 103 may be displayed when data from the UWB or other sensor of the electronic device 107 indicates that the electronic device 107 is pointed at the electronic device 103. For example, the selection of the electronic device 103 for gesture control may be received by determining, using the data from the UWB or other (e.g., BLE or imaging) sensor, that the electronic device is pointed at the electronic device 103 as in the example of FIG. 8. In one or more implementations, the electronic device 103 can be selected by holding the electronic device 107 pointed at the location corresponding to the electronic device 103 for a predetermined period of time (e.g., a period of time that is sufficient for an exchange of UWB or other communications between the electronic device 107 and the electronic device 103, such as UWB or other communications including a device identifier and/or one or more capabilities of the electronic device 103, sent from the electronic device 103 to the electronic device 107 responsive to a detection of a UWB or other signal from the electronic device 107), and/or based on the user performing a gesture 889 (e.g., a hand gesture in which the user's hand and/or finger(s) are pointed at the electronic device 103) while the electronic device 107 is pointed at the location corresponding to the electronic device 103.

Figure 9:
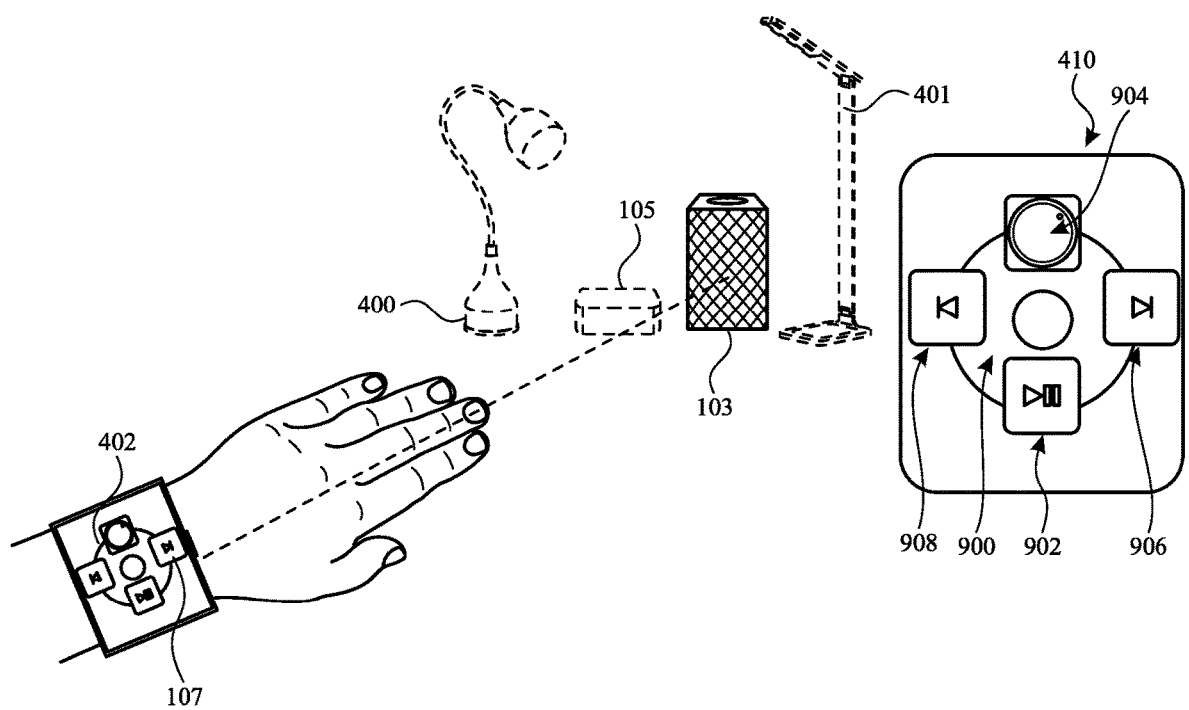
FIG. 9 illustrates a use case in which an electronic device surfaces a different set of gesture-control icons for gesture control of the selected device of FIG. 8 in accordance with one or more implementations.

In one or more implementations, the electronic device 107 may obtain, based on the selection of the electronic device 103 (e.g., and/or based on one or more received and/or previously stored capabilities of the electronic device 103), one or more gesture-control elements 264 for the electronic device 103. For example, FIG. 9 illustrates a use case in which the electronic device 107 stores multiple gesture-control elements 264 of a gesture control set for the electronic device 103. In the example of FIG. 9, the gesture-control elements 264 for the electronic device 103 include a play/pause button, a volume control knob, a fast-forward button, and a reverse button represented, respectively by a gesture-control icon 902, a gesture-control icon 904, gesture-control icon 906, and gesture-control icon 908 in a set 900 of gesture-control icons for the electronic device 103.

Figure 10:
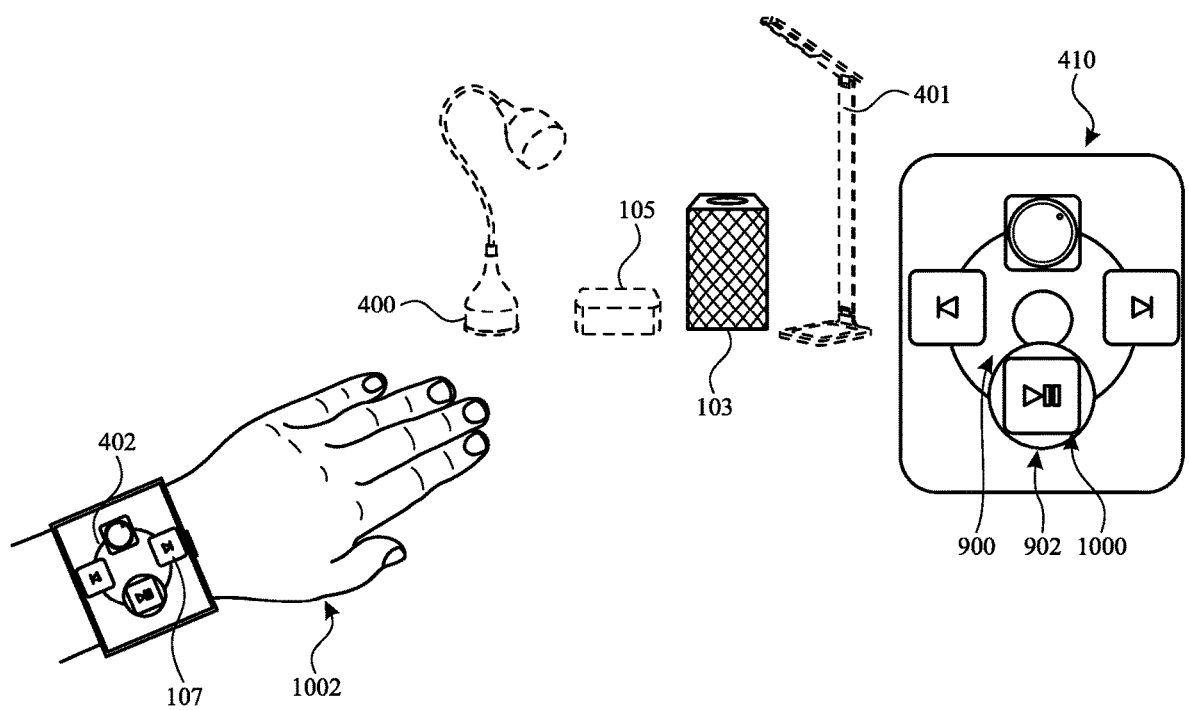
FIG. 10 illustrates a use case in which an electronic device receives a selection of a gesture-control icon in accordance with one or more implementations.

In one or more implementations, the electronic device 107 may receive a selection of one of the gesture-control icons 902, 904, 906, and 908 as illustrated in FIG. 10. The selection of the one of the gesture-control icons 902, 904, 906, and 908 may be based on an IMU detection of a rotation of the electronic device 107 itself and/or based on a gesture 1002 by the user of the electronic device 107. For example, the gesture 1002 may be a rotation of the user's wrist or arm or a movement of the electronic device 107 itself, or another gesture for moving an indicator 1000 among the displayed gesture-control icons. In the example of FIG. 10, the gesture 1002 is detected by the electronic device 107 as a gesture to select the gesture-control icon 902 corresponding to the play/pause button.

Figure 11:
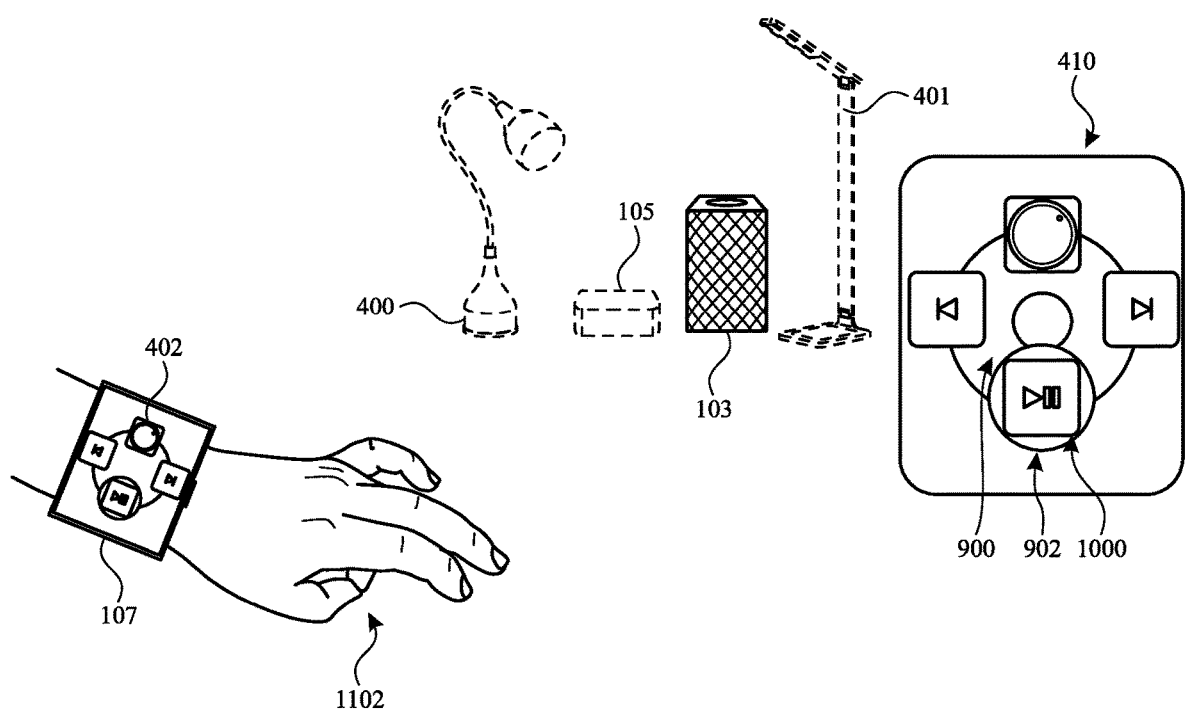
FIG. 11 illustrates a use case in which an electronic device detects a gesture for operation of a selected gesture-control icon in accordance with one or more implementations.

As indicated by FIG. 11, once the gesture-control icon 902 has been selected (e.g., as indicated by the indicator 1000), the electronic device 107 may detect a gesture 1102 for interaction with the selected gesture-control icon 902. In this example, the gesture 1102 may be a finger movement gesture that can be detected by the electronic device 107 as a button push gesture for pressing the play-pause button represented by the gesture-control icon 902. In this example, the representation of the gesture-control icon 902 as a button may help to inform the user that a button push gesture can be used to control the smart speaker 103, and thus elicit the desired control gesture from the user (e.g., without having to provide an explanation to the user in words and/or text as to how to operate the smart speaker 103 using the electronic device 104). The gesture 1102 may be recognized by receiving sensor data from a sensor (e.g., an image sensor, an EMG sensor, etc.) of the electronic device 107, and providing the received sensor data to a machine learning model 208 trained to recognize a predetermined set gestures including a button-push gesture based on input sensor data from at least the sensor.

For example, responsive to detecting the gesture 1002 while the gesture-control icon 902 and the electronic device 103 are selected, the electronic device 103 may generate and transmit a control signal to the electronic device 103 to begin playing audio content or to pause playback of ongoing audio content. Responsive to the control signal, the electronic device 103 may begin playing the audio content or pause the playback of the ongoing audio content. In one or more implementations, the electronic device 107 and the electronic device 103 may establish a Bluetooth connection, using device identifier information exchanged via the UWB communications for detection of the selection of the electronic device 103 for gesture control In one or more implementations, the electronic device 107 and the electronic device 103 may establish a transport layer for exchange of control signals for operating the electronic device 103 responsive to gestures detected at the electronic device 107.

Figure 12:
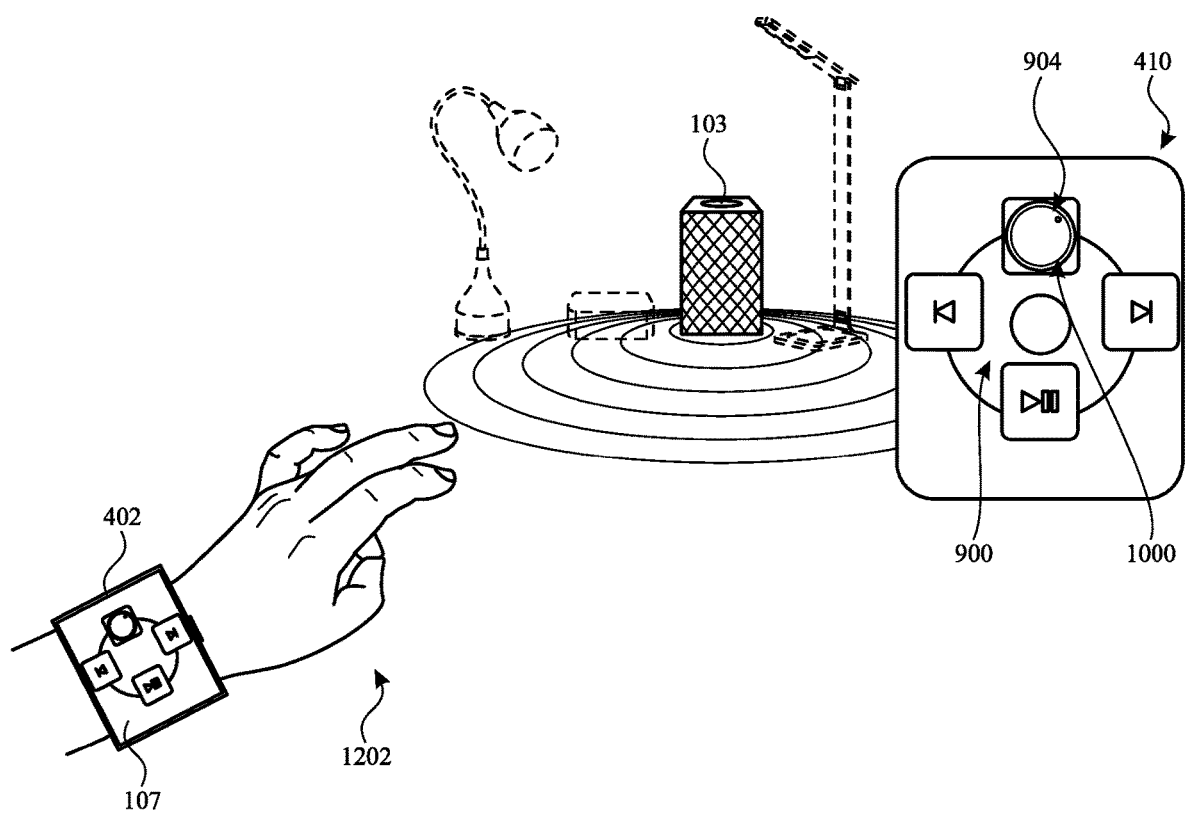
FIG. 12 illustrates a use case in which an electronic device receives a selection of another gesture-control icon in accordance with one or more implementations.

In one or more implementations, the electronic device 107 may receive a selection of another one of the gesture-control icons 902, 904, 906, and 908, based on a movement of the electronic device (e.g., as detected using an IMU sensor, such as an accelerometer, a gyroscope, and/or a magnetometer) and/or based on a gesture 1202 by the user of the electronic device 107 as shown in FIG. 12. For example, the gesture 1202 may be a rotation of the user's wrist or arm or a movement of the electronic device 107 itself, or another gesture for moving the indicator 1000 among the displayed gesture-control icons. In the example of FIG. 12, the gesture 1202 is detected by the electronic device 107 as a gesture to select the gesture-control icon 904 corresponding to the volume control knob. In this example, the various gesture-control icons that are presented by the display 402 are each presented in a form that elicits a particular control gesture from the user for operation of the corresponding gesture-control element (e.g., by simulating the corresponding physical control element for a corresponding feature of a corresponding device).

Figure 13:
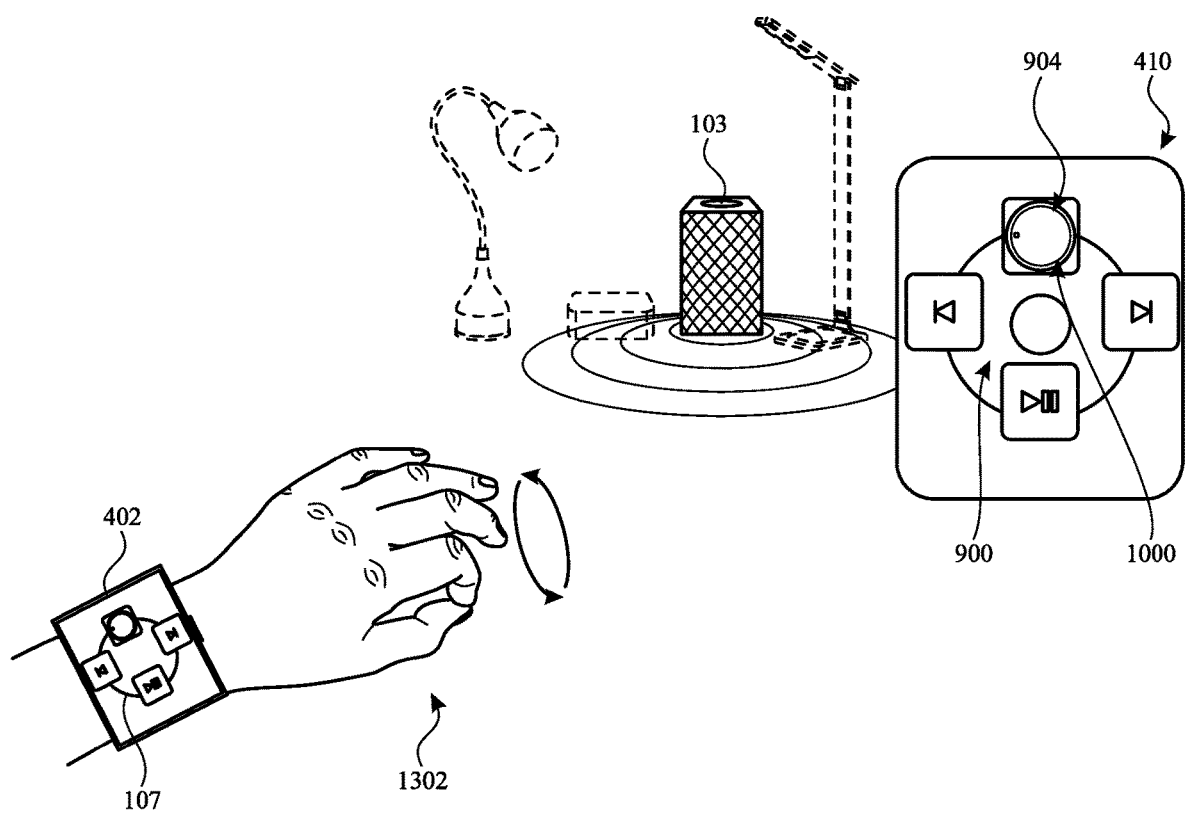
FIG. 13 illustrates a use case in which an electronic device detects another gesture for operation of another selected gesture-control icon in accordance with one or more implementations.

As indicated by FIG. 13, once the gesture-control icon 904 has been selected (e.g., as indicated by the indicator 1000), the electronic device 107 may detect another gesture 1302 to interact with the gesture-control icon 902. In this example, the gesture 1302 may be a rotation of the user's hand or wrist (e.g., in one or another direction) combined with a pinch gesture, that can be detected by the electronic device 107 as knob rotation gesture for rotating the volume control knob (e.g., clockwise or counterclockwise) represented by the gesture-control icon 904.

For example, responsive to detecting the gesture 1302 while the gesture-control icon 904 and the electronic device 103 are selected, the electronic device 103 may generate and transmit a control signal to the electronic device 103 to reduce (e.g., as in FIG. 13) or increase the volume of the output of audio content by the electronic device 103. Responsive to the control signal, the electronic device 103 may correspondingly reduce or increase the volume of the audio content. The gesture-control icon 904 is an example of a continuous-control element that can be provided by the electronic device 107 in one or more implementations.

Figure 14:
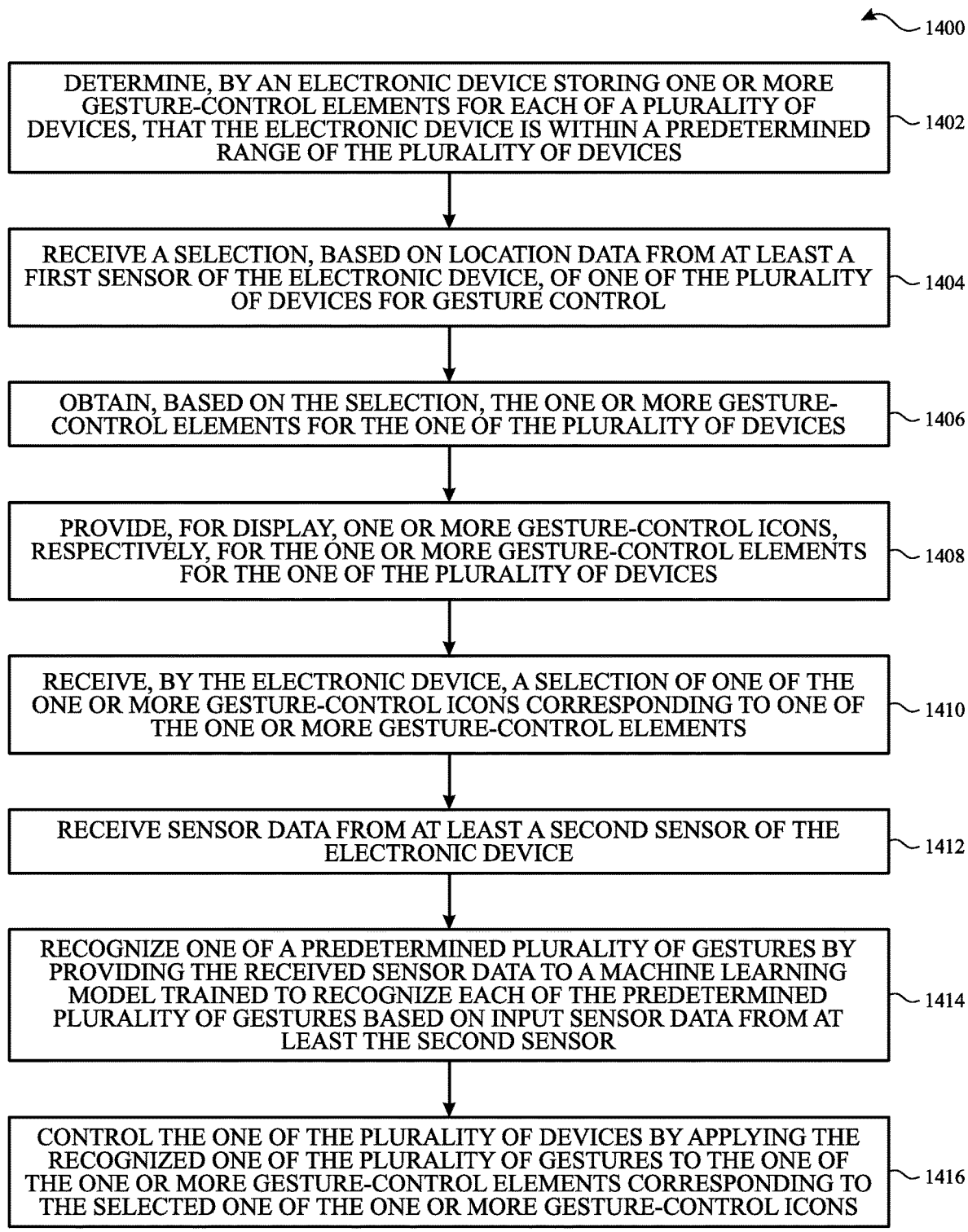
FIG. 14 illustrates a flow chart of an example process for operating an electronic device for gesture control of another device in accordance with one or more implementations.

FIG. 14 illustrates a flow diagram of an example process 1400 for multi-device gesture control, in accordance with one or more implementations. For explanatory purposes, the process 1400 is primarily described herein with reference to the electronic device 107 of FIG. 1. However, the process 1400 is not limited to the electronic device 107 of FIG. 1, and one or more blocks (or operations) of the process 1400 may be performed by one or more other components and/or other suitable devices. Further for explanatory purposes, the blocks of the process 1400 are described herein as occurring in serial, or linearly. However, multiple blocks of the process 1400 may occur in parallel. In addition, the blocks of the process 1400 need not be performed in the order shown and/or one or more blocks of the process 1400 need not be performed and/or can be replaced by other operations.

In the example of FIG. 14, at block 1402, an electronic device (e.g., device 200 such as electronic device 107) storing one or more gesture-control elements (e.g., gesture-control elements 264) for each of a plurality of devices (e.g., appliance 121, light source 123, IoT device 122, any of electronic devices 102-106, lamp 400, lamp 401 and/or other devices that can receive wireless control signals from another electronic device) that the electronic device is within a predetermined range (e.g., a range within which UWB, Bluetooth, and/or direct WiFi signals can be exchanged between the electronic device and the plurality of devices) of the plurality of devices. The electronic device may also determine, at block 1402, that a pointing gesture has been received from the user. The electronic device may also determine, at block 1402, that the electronic device is pointed generally in the direction of the plurality of devices while being within the predetermined range of the plurality of devices.

In one or more implementations, responsive to determining, by the electronic device, that the electronic device is within the predetermined range of the plurality of devices, the electronic device may provide, for display, a one or more device icons arranged for display according to a corresponding locations of the plurality of devices (e.g., as described above in connection with FIGS. 4 and 5). In one or more implementations, the electronic device may receive a user input for activating a gesture input mode prior to displaying the one or more device icons. For example, the user of the electronic device may activate a gesture input mode by engaging in a pointing gesture with the electronic device while the electronic device is (e.g., simultaneously) generally pointing in the direction of and within the predetermined range of the plurality of devices.

At block 1404, the electronic device 107 may receive a selection, based on location data from at least a first sensor (e.g., a UWB sensor, an image sensor, a BLE antenna, etc.) of the electronic device, of one of the plurality of devices for gesture control (e.g., as described above in connection with FIGS. 6 and 8). For example, the first sensor may be a UWB sensor or another sensor as described herein, and receiving the selection of the one of the plurality of devices for gesture control may include determining, using the data from the first sensor, that the electronic device is pointed at the one of the plurality of devices. In one or more implementations, one or more or all of the plurality of devices may include a UWB sensor configured for UWB communications with a UWB sensor of the electronic device 107 and/or other electronic devices that are UWB enabled. In one or more implementations, the electronic device may also highlight the device icon for the one of the plurality of devices when the data from the first sensor indicates that the electronic device is pointed at the one of the plurality of devices.

In one or more implementations, prior to determining that the electronic device is pointed at the one of the plurality of devices (e.g., prior to receiving the selection of the one of the plurality of devices), and responsive to determining, by the electronic device, (i) that the electronic device is within the predetermined range of the plurality of devices, (ii) that the user has engaged in a pointing gesture, and (iii) that the electronic device is pointed in the direction of the plurality of devices: providing, for display, a plurality of device icons arranged for display according to a plurality of corresponding locations of the plurality of devices. In one more implementations, the electronic device may determine that the electronic device is pointed in the direction of the plurality of devices by determining that the electronic devices is pointing generally in the direction of one or more of the one or more devices (e.g., using measurement data and/or a sensor that is more coarse that the sensor and/or data that are used to determine which of several devices to which the electronic device is pointing for device selection). In one or more implementations, the electronic device may determine that the user has engaged in a pointing gesture by detecting a lifting of the user's arm, or a lifting of the user's arm without a rotation of the device display to face the user's eyes (as examples).

Although various examples are described herein in which selection of a device for gesture control is performed using a sensor such as a UWB sensor, a BLE sensor, an image sensor, or the like of a control device that detects the device for gesture control, other implementations are contemplated in which (e.g., in the absence of available sensors or sensor data that can accurately determine which device is being pointed at), the selection of a device for gesture control can be performed by tapping on an icon representing the device on a touch screen of the control device, or by use of a scroll wheel on the control device (e.g., a scroll wheel controlled by a crown of a wrist-worn device) to select among devices for gesture control.

At block 1406, the electronic device may obtain, based on the selection, the one or more gesture-control elements for the one of the plurality of devices. In one or more implementations, the one or more gesture-control elements for the one of the plurality of devices may include a plurality of gesture-control elements for the one of the plurality of devices (e.g., as described above in connection with FIGS. 9-13).

At block 1408, the electronic device may provide, for display, one or more gesture-control icons (e.g., gesture control icons such as gesture-control icons 700, 902, 904, 906, and 908 of FIGS. 7 and/or 9), respectively, for the one or more gesture-control elements for the one of the plurality of devices.

At block 1410, the electronic device may receive a selection of one of the one or more gesture-control icons corresponding to one of the one or more gesture-control elements. In one or more implementations, the electronic device may receive, using an inertial measurement unit, a selection of one of the plurality of gesture-control elements for the one of the plurality of devices. For example, the IMU (e.g., an accelerometer, a gyroscope and/or a magnetometer) may sense the user rotating the electronic device to move an indicator among multiple gesture-control icons displayed by the display of the electronic device. As another example, one or more image sensors, EMG sensors, or other sensors may detect a user gesture to move an indicator among multiple gesture-control icons displayed by the display of the electronic device.

At block 1412, the electronic device may receive sensor data from at least a second sensor (e.g., an IMU sensor, an EMG sensor, a camera or image sensor, etc.) of the electronic device. For example, receiving the sensor data from at least the second sensor of the electronic device may include receiving the sensor data from at least the second sensor of the electronic device while the one of the plurality of devices is selected for control and while the one of the one or more gesture-control icons is selected. In one or more implementations, the at least the second sensor may include an electromyography sensor. In one or more implementations, the at least the second sensor may also include an inertial measurement unit (IMU), including, for example, one or more of an accelerometer, a gyroscope and/or a magnetometer.

At block 1414, the electronic device may recognize one of a predetermined plurality of gestures by providing the received sensor data to a machine learning model (e.g., one or more of machine learning models 208) trained to recognize each of the predetermined plurality of gestures based on input sensor data from at least the second sensor. In one or more implementations, the same gesture detected by the machine learning model may be interpreted differently for different selected devices. In one or more implementations, recognizing the one of the plurality of gestures by providing the received sensor data to the machine learning model may include providing electromyography data from the electromyography sensor to the machine learning model while the one of the plurality of gesture-control elements for the one of the plurality of devices is selected. In one or more implementations, the one of the one or more gesture-control elements corresponding to the selected one of the one or more gesture-control icons includes a continuous-control element (e.g., a knob, a dial, a slider, etc.), and recognizing the one of the plurality of gestures by providing the received sensor data to the machine learning model includes generating a continuous control output from the machine learning model by providing a stream of electromyography data from the electromyography sensor to the machine learning model. In one or more implementations, the machine learning model may have been trained, using input training data that includes training EMG and/or other sensor signal patterns generated by training users making each of the finite set of gestures and output training data including identifiers of each of the finite set of gestures, to detect each of the finite set of gestures when a user makes the same or similar gesture while wearing a device implementing EMG and/or other sensors.

At block 1416, the electronic device may control the one of the plurality of devices by applying the recognized one of the plurality of gestures to the one of the one or more gesture-control elements corresponding to the selected one of the one or more gesture-control icons. Applying the recognized one of the plurality of gestures to the one of the one or more gesture-control elements corresponding to the selected one of the one or more gesture-control icons may include generating a control signal based on the recognized gesture and the selected gesture-control element and/or icon, and transmitting the control signal to the selected device. For example, in one or more implementations, controlling the one of the plurality of devices may include generating, by the electronic device, a control signal corresponding to the one of the one or more gesture-control elements corresponding to the selected one of the one or more gesture-control icons; and transmitting the control signal to the one of the plurality of devices. For example, the electronic device may generate and transmit control signals to a lamp or other light source that cause the lamp or other light source to raise or lower the brightness of the lamp or other light source based on the recognized gesture as in the example of FIG. 7. As another example, the electronic device may generate and transmit control signals that cause a start or a pause of output of audio content by a smart speaker based on the recognized gesture, as in the example of FIG. 11. As another example, the electronic device may generate and transmit control signals to a smart speaker that cause the smart speaker modify the volume of output of audio content by the smart speaker based on the recognized gesture, as in the example of FIG. 13.

As described above, one aspect of the present technology is the gathering and use of data available from specific and legitimate sources for multi-device gesture control. The present disclosure contemplates that in some instances, this gathered data may include personal information data that uniquely identifies or can be used to identify a specific person. Such personal information data can include demographic data, location-based data, online identifiers, telephone numbers, email addresses, home addresses, device identifiers, data or records relating to a user's health or level of fitness (e.g., vital signs measurements, medication information, exercise information, EMG signals), date of birth, or any other personal information.

The present disclosure recognizes that the use of such personal information data, in the present technology, can be used to the benefit of users. For example, the personal information data can be used for providing multi-device gesture control. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates aspects in which users selectively block the use of, or access to, personal information data. That is, the present disclosure contemplates that hardware and/or software elements can be provided to prevent or block access to such personal information data. For example, in the case of providing multi-device gesture control, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 15:
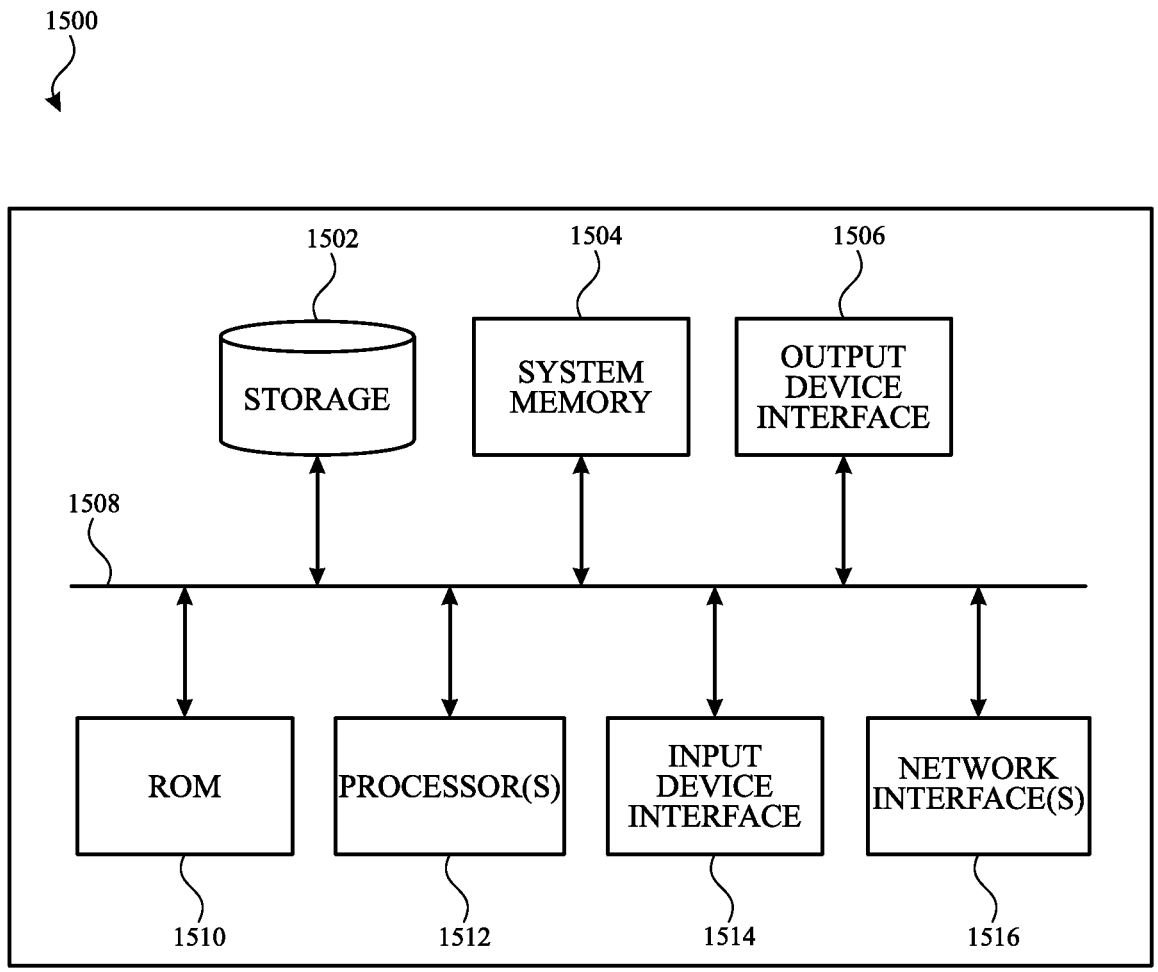
FIG. 15 is a block diagram illustrating an example computer system with aspects of the subject technology can be implemented.

FIG. 15 illustrates an electronic system 1500 with which one or more implementations of the subject technology may be implemented. The electronic system 1500 can be, and/or can be a part of, one or more of the electronic devices 102-107 and/or the server 114 shown in FIG. 1. The electronic system 1500 may include various types of computer readable media and interfaces for various other types of computer readable media. The electronic system 1500 includes a bus 1508, one or more processing unit(s) 1512, a system memory 1504 (and/or buffer), a ROM 1510, a permanent storage device 1502, an input device interface 1514, an output device interface 1506, and one or more network interfaces 1516, or subsets and variations thereof.

The bus 1508 collectively represents all system, peripheral, and chipset buses that communicatively connect the numerous internal devices of the electronic system 1500. In one or more implementations, the bus 1508 communicatively connects the one or more processing unit(s) 1512 with the ROM 1510, the system memory 1504, and the permanent storage device 1502. From these various memory units, the one or more processing unit(s) 1512 retrieves instructions to execute and data to process in order to execute the processes of the subject disclosure. The one or more processing unit(s) 1512 can be a single processor or a multi-core processor in different implementations.

The ROM 1510 stores static data and instructions that are needed by the one or more processing unit(s) 1512 and other modules of the electronic system 1500. The permanent storage device 1502, on the other hand, may be a read-and-write memory device. The permanent storage device 1502 may be a non-volatile memory unit that stores instructions and data even when the electronic system 1500 is off. In one or more implementations, a mass-storage device (such as a magnetic or optical disk and its corresponding disk drive) may be used as the permanent storage device 1502.

In one or more implementations, a removable storage device (such as a floppy disk, flash drive, and its corresponding disk drive) may be used as the permanent storage device 1502. Like the permanent storage device 1502, the system memory 1504 may be a read-and-write memory device. However, unlike the permanent storage device 1502, the system memory 1504 may be a volatile read-and-write memory, such as random access memory. The system memory 1504 may store any of the instructions and data that one or more processing unit(s) 1512 may need at runtime. In one or more implementations, the processes of the subject disclosure are stored in the system memory 1504, the permanent storage device 1502, and/or the ROM 1510. From these various memory units, the one or more processing unit(s) 1512 retrieves instructions to execute and data to process in order to execute the processes of one or more implementations.

The bus 1508 also connects to the input and output device interfaces 1514 and 1506. The input device interface 1514 enables a user to communicate information and select commands to the electronic system 1500. Input devices that may be used with the input device interface 1514 may include, for example, microphones, alphanumeric keyboards, touchscreens, touchpads, and pointing devices (also called "cursor control devices"). The output device interface 1506 may enable, for example, the display of images generated by electronic system 1500. Output devices that may be used with the output device interface 1506 may include, for example, speakers, printers and display devices, such as a liquid crystal display (LCD), a light emitting diode (LED) display, an organic light emitting diode (OLED) display, a flexible display, a flat panel display, a solid state display, a projector, a light source, a haptic components, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 15, the bus 1508 also couples the electronic system 1500 to one or more networks and/or to one or more network nodes, such as the server 114 shown in FIG. 1, through the one or more network interface(s) 1516. In this manner, the electronic system 1500 can be a part of a network of computers (such as a LAN, a wide area network ("WAN"), or an Intranet, or a network of networks, such as the Internet. Any or all components of the electronic system 1500 can be used in conjunction with the subject disclosure.

In accordance with aspects of the disclosure, a method is provided that includes determining, by an electronic device storing one or more gesture-control elements for each of a plurality of devices, that the electronic device is within a predetermined range of the plurality of devices; receiving a selection, based on data from at least a first sensor of the electronic device, of one of the plurality of devices for gesture control; obtaining, based on the selection, the one or more gesture-control elements for the one of the plurality of devices; providing, for display, one or more gesture-control icons, respectively, for the one or more gesture-control elements for the one of the plurality of devices; receiving, by the electronic device, a selection of one of the one or more gesture-control icons corresponding to one of the one or more gesture-control elements; receiving sensor data from at least a second sensor of the electronic device; recognizing one of a predetermined plurality of gestures by providing the received sensor data to a machine learning model trained to recognize each of the predetermined plurality of gestures based on input sensor data from at least the second sensor; and controlling the one of the plurality of devices by applying the recognized one of the predetermined plurality of gestures to the one of the one or more gesture-control elements corresponding to the selected one of the one or more gesture-control icons.

In accordance with aspects of the disclosure, an electronic device is provided that includes a first sensor; a second sensor; memory storing: one or more gesture-control elements for each of a plurality of devices; and a machine learning model trained to recognize each of a predetermined plurality of gestures based on input sensor data from at least the second sensor; and one or more processors configured to: determine that the electronic device is within a predetermined range of the plurality of devices; receive a selection, based on data from at least the first sensor of the electronic device, of one of the plurality of devices for gesture control; obtain, based on the selection, the one or more gesture-control elements for the one of the plurality of devices; provide, for display, one or more gesture-control icons, respectively, for the one or more gesture-control elements for the one of the plurality of devices; receive a selection of one of the one or more gesture-control icons corresponding to one of the one or more gesture-control elements; receive sensor data from at least the second sensor; recognize one of the predetermined plurality of gestures by providing the received sensor data to the machine learning model; and control the one of the plurality of devices by applying the recognized one of the predetermined plurality of gestures to the one of the one or more gesture-control elements corresponding to the selected one of the one or more gesture-control icons.

In accordance with aspects of the disclosure, a non-transitory machine-readable medium is provided storing instructions which, when executed by one or more processors, cause the one or more processors to perform operations including: determining, by an electronic device storing one or more gesture-control elements for each of a plurality of devices, that the electronic device is within a predetermined range of the plurality of devices; receiving a selection, based on data from at least a first sensor of the electronic device, of one of the plurality of devices for gesture control; obtaining, based on the selection, the one or more gesture-control elements for the one of the plurality of devices; providing, for display, one or more gesture-control icons, respectively, for the one or more gesture-control elements for the one of the plurality of devices; receiving, by the electronic device, a selection of one of the one or more gesture-control icons corresponding to one of the one or more gesture-control elements; receiving sensor data from at least a second sensor of the electronic device; recognizing one of a predetermined plurality of gestures by providing the received sensor data to a machine learning model trained to recognize each of the predetermined plurality of gestures based on input sensor data from at least the second sensor; and controlling the one of the plurality of devices by applying the recognized one of the predetermined plurality of gestures to the one of the one or more gesture-control elements corresponding to the selected one of the one or more gesture-control icons.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
   determining, by an electronic device storing one or more gesture-control elements for each of a plurality of devices, that the electronic device is within a predetermined range of the plurality of devices;
   receiving a selection, based on data from at least a first sensor of the electronic device, of one of the plurality of devices for gesture control;
   obtaining, based on the selection, the one or more gesture-control elements for the one of the plurality of devices;
   providing, for display, one or more gesture-control icons, respectively, for the one or more gesture-control elements for the one of the plurality of devices;
   receiving, by the electronic device, a selection of one of the one or more gesture-control icons corresponding to one of the one or more gesture-control elements;
   receiving sensor data from at least a second sensor of the electronic device;
   recognizing one of a predetermined plurality of gestures by providing the received sensor data to a machine learning model trained to recognize each of the predetermined plurality of gestures based on input sensor data from at least the second sensor; and
   controlling the one of the plurality of devices by applying the recognized one of the predetermined plurality of gestures to the one of the one or more gesture-control elements corresponding to the selected one of the one or more gesture-control icons.

2. The method of claim 1, wherein the controlling comprises:
   generating, by the electronic device, a control signal corresponding to the one of the one or more gesture-control elements; and
   transmitting the control signal to the one of the plurality of devices.

3. The method of claim 1, wherein receiving the sensor data from at least the second sensor of the electronic device comprises receiving the sensor data from at least the second sensor of the electronic device while the one of the plurality of devices is selected for control and while the one of the one or more gesture-control icons is selected.

4. The method of claim 1, wherein receiving a selection of the one of the plurality of devices for gesture control comprises determining, using the data from the first sensor, that the electronic device is pointed at the one of the plurality of devices.

5. The method of claim 4, further comprising, prior to determining that the electronic device is pointed at the one of the plurality of devices, and responsive to determining, by the electronic device, that the electronic device is within the predetermined range of the plurality of devices, that a user of the electronic device has engaged in a pointing gesture, and that the electronic device is pointed in the direction of the plurality of devices:
   providing, for display, a plurality of device icons arranged for display according to a plurality of corresponding locations of the plurality of devices.

6. The method of claim 5, further comprising highlighting the device icon for the one of the plurality of devices when the data from the first sensor indicates that the electronic device is pointed at the one of the plurality of devices.

7. The method of claim 5, further comprising:
   following the controlling, receiving a subsequent selection, based on additional data from at least the first sensor of the electronic device, of a different one of the plurality of devices for gesture control;
   obtaining, based on the selection, the one or more gesture-control elements for the different one of the plurality of devices, wherein the one or more gesture-control elements for the one of the plurality of devices is different from one or more gesture-control elements for the different one of the plurality of devices; and
   providing, for display in place of the one or more gesture-control icons for the one or more gesture-control elements for the one of the plurality of devices, one or more different gesture control icons corresponding to the one or more gesture-control elements for the different one of the plurality of devices.

8. The method of claim 4, wherein the at least the second sensor comprises an electromyography sensor.

9. The method of claim 8, wherein the at least the second sensor further comprises an inertial measurement unit.

10. The method of claim 9, wherein the one or more gesture-control elements for the one of the plurality of devices comprise a plurality of gesture-control elements for the one of the plurality of devices.

11. The method of claim 9, further comprising receiving, by the electronic device using the inertial measurement unit, a selection of one of the one or more gesture-control elements for the one of the plurality of devices.

12. The method of claim 11, wherein recognizing the one of the predetermined plurality of gestures by providing the received sensor data to the machine learning model comprises providing electromyography data from the electromyography sensor to the machine learning model while the one of the one or more gesture-control elements for the one of the plurality of devices is selected.

13. The method of claim 8, wherein the one of the one or more gesture-control elements corresponding to the selected one of the one or more gesture-control icons comprises a continuous-control element, and wherein recognizing the one of the predetermined plurality of gestures by providing the received sensor data to the machine learning model comprises generating a continuous control output from the machine learning model by providing a stream of electromyography data from the electromyography sensor to the machine learning model.

14. An electronic device, comprising:
a first sensor;
a second sensor;
memory storing:
one or more gesture-control elements for each of a plurality of devices; and
a machine learning model trained to recognize each of a predetermined plurality of gestures based on input sensor data from at least the second sensor; and
one or more processors configured to:
determine that the electronic device is within a predetermined range of the plurality of devices;
receive a selection, based on data from at least the first sensor of the electronic device, of one of the plurality of devices for gesture control;
obtain, based on the selection, the one or more gesture-control elements for the one of the plurality of devices;
provide, for display, one or more gesture-control icons, respectively, for the one or more gesture-control elements for the one of the plurality of devices;
receive a selection of one of the one or more gesture-control icons corresponding to one of the one or more gesture-control elements;
receive sensor data from at least the second sensor;
recognize one of the predetermined plurality of gestures by providing the received sensor data to the machine learning model; and
control the one of the plurality of devices by applying the recognized one of the predetermined plurality of gestures to the one of the one or more gesture-control elements corresponding to the selected one of the one or more gesture-control icons.

15. The electronic device of claim 14, wherein the one or more processors are configured to receive a selection of the one of the plurality of devices for gesture control by determining, using the data from the first sensor, that the electronic device is pointed at the one of the plurality of devices.

16. The electronic device of claim 15, wherein the one or more processors are further configured to, prior to determining that the electronic device is pointed at the one of the plurality of devices, and responsive to determining that the electronic device is within the predetermined range of the plurality of devices, that a user of the electronic device has engaged in a pointing gesture, and that the electronic device is pointed in the direction of the plurality of devices, provide, for display, a plurality of device icons arranged for display according to a plurality of corresponding locations of the plurality of devices.

17. The electronic device of claim 16, wherein the one or more processors are further configured to highlight the device icon for the one of the plurality of devices when the data from the first sensor indicates that the electronic device is pointed at the one of the plurality of devices.

18. The electronic device of claim 15, wherein the second sensor comprises at least one of an electromyography sensor, an accelerometer, a gyroscope, or a magnetometer.

19. A non-transitory machine-readable medium storing instructions which, when executed by one or more processors, cause the one or more processors to perform operations comprising:
determining, by an electronic device storing one or more gesture-control elements for each of a plurality of devices, that the electronic device is within a predetermined range of the plurality of devices;
receiving a selection, based on data from at least a first sensor of the electronic device, of one of the plurality of devices for gesture control;
obtaining, based on the selection, the one or more gesture-control elements for the one of the plurality of devices;
providing, for display, one or more gesture-control icons, respectively, for the one or more gesture-control elements for the one of the plurality of devices;
receiving, by the electronic device, a selection of one of the one or more gesture-control icons corresponding to one of the one or more gesture-control elements;
receiving sensor data from at least a second sensor of the electronic device;
recognizing one of a predetermined plurality of gestures by providing the received sensor data to a machine learning model trained to recognize each of the predetermined plurality of gestures based on input sensor data from at least the second sensor; and
controlling the one of the plurality of devices by applying the recognized one of the predetermined plurality of gestures to the one of the one or more gesture-control elements corresponding to the selected one of the one or more gesture-control icons.

20. The non-transitory machine-readable medium of claim 19, wherein the one or more gesture-control elements for the one of the plurality of devices comprise a plurality of gesture-control elements for the one of the plurality of devices.

21. The non-transitory machine-readable medium of claim 20, the operations further comprising receiving, by the electronic device using an inertial measurement unit of the electronic device, a selection of one of the plurality of gesture-control elements for the one of the plurality of devices.

22. The non-transitory machine-readable medium of claim 21, wherein recognizing the one of the predetermined plurality of gestures by providing the received sensor data to the machine learning model comprises providing electromyography data from an electromyography sensor to the machine learning model while the one of the plurality of gesture-control elements for the one of the plurality of devices is selected.

23. A method, comprising:
determining, by an electronic device storing one or more gesture-control elements for each of a plurality of devices, that the electronic device is within a predetermined range of the plurality of devices;
obtaining, based on a selection of one of the plurality of devices using the electronic device, the one or more gesture-control elements for the one of the plurality of devices;
providing, for display, one or more gesture-control icons;
receiving, by the electronic device, a selection of one of the one or more gesture-control icons corresponding to one of the one or more gesture-control elements;
receiving sensor data from a sensor of the electronic device;
providing the sensor data to a machine learning model trained to recognize each of a predetermined plurality of gestures based on input sensor data from the sensor; and
controlling the one of the plurality of devices based on an output of the machine learning model.

* * * * *